(12) United States Patent
Kobayashi

(10) Patent No.: US 10,272,723 B2
(45) Date of Patent: Apr. 30, 2019

(54) PNEUMATIC TIRE

(71) Applicant: The Yokohama Rubber Co., LTD., Minato-ku, Tokyo (JP)

(72) Inventor: Hironori Kobayashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 355 days.

(21) Appl. No.: 14/655,694

(22) PCT Filed: Dec. 28, 2012

(86) PCT No.: PCT/JP2012/084212
§ 371 (c)(1),
(2) Date: Jun. 25, 2015

(87) PCT Pub. No.: WO2014/103063
PCT Pub. Date: Jul. 3, 2014

(65) Prior Publication Data
US 2015/0328930 A1    Nov. 19, 2015

(51) Int. Cl.
*B60C 9/18* (2006.01)
*B60C 9/00* (2006.01)
(Continued)

(52) U.S. Cl.
CPC ................ *B60C 9/18* (2013.01); *B60C 3/04* (2013.01); *B60C 9/0007* (2013.01); *B60C 9/185* (2013.01);
(Continued)

(58) Field of Classification Search
CPC .......... B60C 9/185; B60C 9/2204; B60C 9/22
See application file for complete search history.

(56) References Cited

U.S. PATENT DOCUMENTS 3,939,890 A * 2/1976 Abe ................. B60C 11/00
152/209.13
4,215,734 A * 8/1980 Suzuki ............... B60C 9/18
152/209.1
(Continued)

FOREIGN PATENT DOCUMENTS

EP    0554108 A1 * 8/1993 .............. B60C 3/04
JP    03099903 A  *  9/1989
(Continued)

OTHER PUBLICATIONS

Yamada—JP H03-099903, English translation.*
International Search Report for International Application No. PCT/JP2012/084212 dated Apr. 9, 2013, 4 pages, Japan.

*Primary Examiner* — Joseph S Del Sole
*Assistant Examiner* — Cedrick S Williams
(74) *Attorney, Agent, or Firm* — Thorpe North & Western

(57) ABSTRACT

A pneumatic tire is provided with at least three circumferential main grooves extending in the circumferential direction of the tire and a plurality of land portions defined by the circumferential main grooves. Additionally, the belt layer is formed by layering a pair of cross belts having a belt angle, as an absolute value, of no less than 10° and no more than 45° and having a belt angles of mutually opposite signs, and a circumferential reinforcing layer having a belt angle within a range of ±5° with respect to a circumferential direction of the tire. A tire ground contact width (Wg) and a carcass cross-sectional width (Wca) of a carcass layer have a relationship such that 0.64≤Wg/Wca≤0.84.

31 Claims, 14 Drawing Sheets

(51) Int. Cl.
   *B60C 11/04*   (2006.01)
   *B60C 9/20*    (2006.01)
   *B60C 9/28*    (2006.01)
   *B60C 3/04*    (2006.01)
   *B60C 11/00*       (2006.01)

(52) U.S. Cl.
   CPC .............. *B60C 9/2006* (2013.01); *B60C 9/28* (2013.01); *B60C 11/04* (2013.01); *B60C 2011/0033* (2013.01); *B60C 2200/06* (2013.01)

(56) References Cited

U.S. PATENT DOCUMENTS

| | | | | |
|---|---|---|---|---|
| 5,637,162 | A * | 6/1997 | Rhyne | B60C 3/04 152/209.14 |
| 6,401,778 | B1 | 6/2002 | Cluzel | |
| 6,659,147 | B1 * | 12/2003 | Cordonnier | B60C 9/22 152/526 |
| 8,162,018 | B2 | 4/2012 | Suzuki et al. | |
| 2004/0026000 | A1 * | 2/2004 | Shimizu | B60C 9/20 152/527 |
| 2004/0069392 | A1 * | 4/2004 | Maruoka | B60C 3/04 152/454 |
| 2005/0000631 | A1 * | 1/2005 | Maruoka | B29D 30/3028 152/209.5 |
| 2005/0016656 | A1 * | 1/2005 | Kuroki | B60C 11/00 152/548 |
| 2006/0048874 | A1 * | 3/2006 | Maruoka | B29D 30/3028 152/209.5 |
| 2006/0169380 | A1 | 8/2006 | Radulescu et al. | |
| 2006/0169381 | A1 | 8/2006 | Radulescu et al. | |
| 2006/0169383 | A1 | 8/2006 | Radulescu et al. | |
| 2007/0199633 | A1 * | 8/2007 | Hayashi | B60C 11/0311 152/209.18 |
| 2009/0277557 | A1 * | 11/2009 | Suzuki | B60C 9/2006 152/532 |
| 2011/0192513 | A1 * | 8/2011 | Hamada | B60C 3/04 152/209.18 |
| 2011/0220259 | A1 * | 9/2011 | Suzuki | B60C 11/00 152/209.18 |
| 2012/0097306 | A1 | 4/2012 | Delebecq et al. | |
| 2012/0097307 | A1 | 4/2012 | Delebecq et al. | |
| 2012/0194076 | A1 | 8/2012 | Murata | |
| 2014/0305566 | A1 * | 10/2014 | Mashiyama | B60C 9/18 152/454 |
| 2014/0326375 | A1 * | 11/2014 | Okabe | B60C 9/0007 152/154.2 |
| 2014/0326380 | A1 * | 11/2014 | Kotoku | B60C 9/0007 152/209.18 |

FOREIGN PATENT DOCUMENTS

| | | | | |
|---|---|---|---|---|
| JP | 03099903 | A * | 4/1991 | ......... B60C 11/0083 |
| JP | H03-099903 | | 4/1991 | |
| JP | 2001-130219 | | 5/2001 | |
| JP | 2001-301425 | | 10/2001 | |
| JP | 2002-087019 | | 3/2002 | |
| JP | 2003-080906 | | 3/2003 | |
| JP | 4008013 | | 11/2007 | |
| JP | 2008-001264 | | 1/2008 | |
| JP | 2008-074250 | | 4/2008 | |
| JP | 4354114 | | 10/2009 | |
| JP | 4642760 | | 3/2011 | |
| JP | 4663638 | | 4/2011 | |
| JP | 4663639 | | 4/2011 | |
| JP | 4984013 | | 7/2012 | |
| JP | 2012-144096 | | 8/2012 | |
| JP | 2012-522686 | | 9/2012 | |
| JP | 2012-522687 | | 9/2012 | |
| JP | 5029787 | | 9/2012 | |
| JP | 5029787 | B1 * | 9/2012 | ........... B60C 9/0007 |
| JP | 5029787 | B1 * | 9/2012 | ........... B60C 9/0007 |
| WO | WO 1999/24269 | | 5/1999 | |
| WO | WO 2005/016667 | | 2/2005 | |
| WO | WO 2005/016668 | | 2/2005 | |
| WO | WO 2007/148447 | | 12/2007 | |
| WO | WO 2010/115891 | | 10/2010 | |
| WO | WO 2010/115892 | | 10/2010 | |
| WO | WO 2013/042254 | | 3/2013 | |
| WO | WO 2013/042256 | | 3/2013 | |

* cited by examiner

COMPARATIVE EXAMPLE
(De/Dcc=1.00, Gsh/Gcc=1.06)

EXAMPLE
(De/Dcc=1.08, Gsh/Gcc=1.20)

| | Conventional example | Comparative example 1 | Comparative example 2 | Working example 1 | Working example 2 | Working example 3 | Working example 4 | Working example 5 |
|---|---|---|---|---|---|---|---|---|
| Presence of circumferential reinforcing layer | None | Yes | Yes | Yes | Yes | Yes | Yes | Yes |
| Gsh/Gcc | 1.00 | 1.06 | 1.24 | 1.10 | 1.20 | 1.20 | 1.25 | 1.20 |
| De/Dcc | - | 1.00 | 1.00 | 1.06 | 1.08 | 1.10 | 1.20 | 1.10 |
| Wg/Wca | 0.87 | 0.87 | 0.87 | 0.64 | 0.64 | 0.74 | 0.84 | 0.74 |
| Wg/Ws | 0.95 | 0.95 | 0.95 | 0.95 | 0.95 | 0.95 | 0.95 | 1 |
| TW/Wca | 0.94 | 0.94 | 0.94 | 0.94 | 0.94 | 0.94 | 0.94 | 0.94 |
| TW/SW | 0.92 | 0.92 | 0.92 | 0.92 | 0.92 | 0.92 | 0.92 | 0.92 |
| Ws/Wca | - | 0.74 | 0.74 | 0.74 | 0.74 | 0.74 | 0.74 | 0.74 |
| Wb2/Wca | 0.92 | 0.92 | 0.92 | 0.92 | 0.92 | 0.92 | 0.92 | 0.92 |
| Yd/Ya | 0.93 | 0.93 | 0.93 | 0.93 | 0.93 | 0.93 | 0.93 | 0.93 |
| He/Hcc | - | 0.92 | 0.92 | 0.92 | 0.92 | 0.92 | 0.92 | 0.92 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 100 | 103 | 104 | 104 | 105 | 108 | 107 | 110 |

FIG. 7A

| | Working example 6 | Working example 7 | Working example 8 | Working example 9 | Working example 10 | Working example 11 | Working example 12 | Working example 13 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.20 | 1.20 | 1.20 | 1.20 | 1.20 | 1.20 | 1.20 |
| De/Dcc | 1.10 | 1.10 | 1.10 | 1.10 | 1.10 | 1.10 | 1.10 | 1.10 |
| Wg/Wca | 0.74 | 0.74 | 0.74 | 0.74 | 0.74 | 0.74 | 0.74 | 0.74 |
| Wg/Ws | 1.13 | 1.25 | 1.13 | 1.13 | 1.13 | 1.13 | 1.13 | 1.13 |
| TW/Wca | 0.94 | 0.94 | 0.82 | 0.87 | 0.92 | 0.87 | 0.87 | 0.87 |
| TW/SW | 0.92 | 0.92 | 0.92 | 0.92 | 0.92 | 0.80 | 0.87 | 0.89 |
| Ws/Wca | 0.74 | 0.74 | 0.74 | 0.74 | 0.74 | 0.74 | 0.74 | 0.74 |
| Wb2/Wca | 0.92 | 0.92 | 0.92 | 0.92 | 0.92 | 0.92 | 0.92 | 0.92 |
| Yd/Ya | 0.93 | 0.93 | 0.93 | 0.93 | 0.93 | 0.93 | 0.93 | 0.93 |
| He/Hcc | 0.92 | 0.92 | 0.92 | 0.92 | 0.92 | 0.92 | 0.92 | 0.92 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 112 | 111 | 111 | 114 | 113 | 115 | 116 | 115 |

FIG. 7B

| | Working example 14 | Working example 15 | Working example 16 | Working example 17 | Working example 18 | Working example 19 | Working example 20 | Working example 21 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.20 | 1.20 | 1.20 | 1.20 | 1.20 | 1.20 | 1.20 |
| De/Dcc | 1.10 | 1.10 | 1.10 | 1.10 | 1.10 | 1.10 | 1.10 | 1.10 |
| Wg/Wca | 0.74 | 0.74 | 0.74 | 0.74 | 0.74 | 0.74 | 0.74 | 0.74 |
| Wg/Ws | 1.13 | 1.13 | 1.13 | 1.13 | 1.13 | 1.13 | 1.13 | 1.13 |
| TW/Wca | 0.87 | 0.87 | 0.87 | 0.87 | 0.87 | 0.87 | 0.87 | 0.87 |
| TW/SW | 0.92 | 0.92 | 0.92 | 0.92 | 0.92 | 0.92 | 0.92 | 0.92 |
| Ws/Wca | 0.60 | 0.65 | 0.70 | 0.65 | 0.65 | 0.65 | 0.65 | 0.65 |
| Wb2/Wca | 0.92 | 0.92 | 0.92 | 0.74 | 0.87 | 0.89 | 0.87 | 0.87 |
| Yd/Ya | 0.93 | 0.93 | 0.93 | 0.93 | 0.93 | 0.93 | 0.95 | 0.98 |
| He/Hcc | 0.92 | 0.92 | 0.92 | 0.92 | 0.92 | 0.92 | 0.92 | 0.92 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 113 | 116 | 115 | 116 | 118 | 117 | 118 | 121 |

FIG. 8A

| | Working example 22 | Working example 23 | Working example 24 | Working example 25 | Working example 26 | Working example 27 | Working example 28 | Working example 29 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.20 | 1.20 | 1.20 | 1.20 | 1.20 | 1.20 | 1.20 |
| De/Dcc | 1.10 | 1.10 | 1.10 | 1.10 | 1.10 | 1.10 | 1.10 | 1.10 |
| Wg/Wca | 0.74 | 0.74 | 0.74 | 0.74 | 0.74 | 0.74 | 0.74 | 0.74 |
| Wg/Ws | 1.13 | 1.13 | 1.13 | 1.13 | 1.13 | 1.13 | 1.13 | 1.13 |
| TW/Wca | 0.87 | 0.87 | 0.87 | 0.87 | 0.87 | 0.87 | 0.87 | 0.87 |
| TW/SW | 0.92 | 0.92 | 0.92 | 0.92 | 0.92 | 0.92 | 0.92 | 0.92 |
| Ws/Wca | 0.65 | 0.65 | 0.65 | 0.65 | 0.65 | 0.65 | 0.65 | 0.65 |
| Wb2/Wca | 0.87 | 0.87 | 0.87 | 0.87 | 0.87 | 0.87 | 0.87 | 0.87 |
| Yd/Ya | 1.00 | 0.98 | 0.98 | 0.98 | 0.98 | 0.98 | 0.98 | 0.98 |
| He/Hcc | 0.92 | 0.95 | 1.10 | 1.20 | 1.10 | 1.10 | 1.10 | 1.10 |
| A | 0.19 | 0.19 | 0.19 | 0.19 | 0.20 | 0.23 | 0.23 | 0.23 |
| tanδ | 0.09 | 0.09 | 0.09 | 0.09 | 0.09 | 0.09 | 0.10 | 0.14 |
| Wet performance | 120 | 122 | 123 | 125 | 126 | 128 | 129 | 130 |

FIG. 8B

| | Conventional example | Comparative example 1 | Comparative example 2 | Working example 30 | Working example 31 | Working example 32 | Working example 33 | Working example 34 |
|---|---|---|---|---|---|---|---|---|
| Presence of circumferential reinforcing layer | None | Yes | Yes | Yes | Yes | Yes | Yes | Yes |
| Gsh/Gcc | 1.06 | 1.06 | 1.24 | 1.10 | 1.20 | 1.20 | 1.25 | 1.20 |
| De/Dcc | — | 1.00 | 1.00 | 1.06 | 1.08 | 1.10 | 1.20 | 1.10 |
| Wg/Wca | 0.83 | 0.83 | 0.87 | 0.60 | 0.60 | 0.70 | 0.80 | 0.70 |
| Wg/Ws | 0.95 | 0.95 | 0.95 | 0.95 | 0.95 | 0.95 | 0.95 | 1.00 |
| TW/Wca | 0.94 | 0.94 | 0.94 | 0.94 | 0.94 | 0.94 | 0.94 | 0.94 |
| TW/SW | 0.92 | 0.92 | 0.92 | 0.92 | 0.92 | 0.92 | 0.92 | 0.92 |
| Ws/Wca | — | 0.74 | 0.74 | 0.74 | 0.74 | 0.74 | 0.74 | 0.74 |
| Wb2/Wca | 0.92 | 0.92 | 0.92 | 0.92 | 0.92 | 0.92 | 0.92 | 0.92 |
| Yd/Ya | 0.93 | 0.93 | 0.93 | 0.93 | 0.93 | 0.93 | 0.93 | 0.93 |
| He/Hcc | — | 0.92 | 0.92 | 0.92 | 0.92 | 0.92 | 0.92 | 0.92 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 100 | 103 | 104 | 104 | 105 | 108 | 107 | 110 |

FIG. 9A

| | Working example 35 | Working example 36 | Working example 37 | Working example 38 | Working example 39 | Working example 40 | Working example 41 | Working example 42 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.20 | 1.20 | 1.20 | 1.20 | 1.20 | 1.20 | 1.20 |
| De/Dcc | 1.10 | 1.10 | 1.10 | 1.10 | 1.10 | 1.10 | 1.10 | 1.10 |
| Wg/Wca | 0.70 | 0.70 | 0.70 | 0.70 | 0.70 | 0.70 | 0.70 | 0.70 |
| Wg/Ws | 1.13 | 1.25 | 1.13 | 1.13 | 1.13 | 1.13 | 1.13 | 1.13 |
| TW/Wca | 0.94 | 0.94 | 0.82 | 0.87 | 0.92 | 0.87 | 0.87 | 0.87 |
| TW/SW | 0.92 | 0.92 | 0.92 | 0.92 | 0.92 | 0.80 | 0.87 | 0.89 |
| Ws/Wca | 0.74 | 0.74 | 0.74 | 0.74 | 0.74 | 0.74 | 0.74 | 0.74 |
| Wb2/Wca | 0.92 | 0.92 | 0.92 | 0.92 | 0.92 | 0.92 | 0.92 | 0.92 |
| Yd/Ya | 0.93 | 0.93 | 0.93 | 0.93 | 0.93 | 0.93 | 0.93 | 0.93 |
| He/Hcc | 0.92 | 0.92 | 0.92 | 0.92 | 0.92 | 0.92 | 0.92 | 0.92 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 112 | 111 | 111 | 114 | 113 | 115 | 116 | 115 |

FIG. 9B

| | Working example 43 | Working example 44 | Working example 45 | Working example 46 | Working example 47 | Working example 48 | Working example 49 | Working example 50 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.20 | 1.20 | 1.20 | 1.20 | 1.20 | 1.20 | 1.20 |
| De/Dcc | 1.10 | 1.10 | 1.10 | 1.10 | 1.10 | 1.10 | 1.10 | 1.10 |
| Wg/Wca | 0.70 | 0.70 | 0.70 | 0.70 | 0.70 | 0.70 | 0.70 | 0.70 |
| Wg/Ws | 1.13 | 1.13 | 1.13 | 1.13 | 1.13 | 1.13 | 1.13 | 1.13 |
| TW/Wca | 0.87 | 0.87 | 0.87 | 0.87 | 0.87 | 0.87 | 0.87 | 0.87 |
| TW/SW | 0.92 | 0.92 | 0.92 | 0.92 | 0.92 | 0.92 | 0.92 | 0.92 |
| Ws/Wca | 0.60 | 0.65 | 0.70 | 0.65 | 0.65 | 0.65 | 0.65 | 0.65 |
| Wb2/Wca | 0.92 | 0.92 | 0.92 | 0.74 | 0.87 | 0.89 | 0.87 | 0.87 |
| Yd/Ya | 0.93 | 0.93 | 0.93 | 0.93 | 0.93 | 0.93 | 0.95 | 0.98 |
| He/Hcc | 0.92 | 0.92 | 0.92 | 0.92 | 0.92 | 0.92 | 0.92 | 0.92 |
| A | 0.19 | 0.19 | 0.19 | 0.19 | 0.19 | 0.19 | 0.19 | 0.19 |
| tanδ | 0.09 | 0.09 | 0.09 | 0.09 | 0.09 | 0.09 | 0.09 | 0.09 |
| Wet performance | 113 | 116 | 115 | 116 | 118 | 117 | 118 | 121 |

FIG. 10A

| | Working example 51 | Working example 52 | Working example 53 | Working example 54 | Working example 55 | Working example 56 | Working example 57 | Working example 58 |
|---|---|---|---|---|---|---|---|---|
| Presence of circumferential reinforcing layer | Yes | Yes | Yes | Yes | Yes | Yes | Yes | Yes |
| Gsh/Gcc | 1.20 | 1.20 | 1.20 | 1.20 | 1.20 | 1.20 | 1.20 | 1.20 |
| De/Dcc | 1.10 | 1.10 | 1.10 | 1.10 | 1.10 | 1.10 | 1.10 | 1.10 |
| Wg/Wca | 0.70 | 0.70 | 0.70 | 0.70 | 0.70 | 0.70 | 0.70 | 0.70 |
| Wg/Ws | 1.13 | 1.13 | 1.13 | 1.13 | 1.13 | 1.13 | 1.13 | 1.13 |
| TW/Wca | 0.87 | 0.87 | 0.87 | 0.87 | 0.87 | 0.87 | 0.87 | 0.87 |
| TW/SW | 0.92 | 0.92 | 0.92 | 0.92 | 0.92 | 0.92 | 0.92 | 0.92 |
| Ws/Wca | 0.65 | 0.65 | 0.65 | 0.65 | 0.65 | 0.65 | 0.65 | 0.65 |
| Wb2/Wca | 0.87 | 0.87 | 0.87 | 0.87 | 0.87 | 0.87 | 0.87 | 0.87 |
| Yd/Ya | 1.00 | 0.98 | 0.98 | 0.98 | 0.98 | 0.98 | 0.98 | 0.98 |
| He/Hcc | 0.92 | 0.95 | 1.10 | 1.20 | 1.10 | 1.10 | 1.10 | 1.10 |
| A | 0.19 | 0.19 | 0.19 | 0.19 | 0.20 | 0.23 | 0.23 | 0.23 |
| tanδ | 0.09 | 0.09 | 0.09 | 0.09 | 0.09 | 0.09 | 0.10 | 0.14 |
| Wet performance | 120 | 122 | 123 | 125 | 126 | 128 | 129 | 130 |

FIG. 10B

PNEUMATIC TIRE

TECHNICAL FIELD

The present technology relates to a pneumatic tire, and in particular to a pneumatic tire with improved wet performance.

BACKGROUND

Recent heavy duty tires mounted on trucks, buses, and the like maintain the shape of the tread portion due to the tires having a low aspect ratio while having a circumferential reinforcing layer disposed in the belt layer. The circumferential reinforcing layer is a belt ply having a belt angle that is substantially 0° with respect to the circumferential direction of the tire, and is disposed so as to be layered on a pair of cross belts. The technologies disclosed in Japanese Patent Nos. 4642760, 4663638 and 4663639, as well as in Japanese Unexamined Patent Application Publication (translation of PCT application) No. 2012-522686, are conventional pneumatic tires that are configured in this manner.

One problem to be addressed in pneumatic tires is the improvement of braking performance when traveling on wet road surfaces.

SUMMARY

The present technology provides a pneumatic tire with improved wet performance in consideration of the above.

A pneumatic tire according to the present technology is provided with a carcass layer, a belt layer disposed at the outer side of the carcass layer in the radial direction of the tire, and tread rubber disposed at the outer side of the belt layer in the radial direction of the tire, as well as at least three circumferential main grooves extending in a circumferential direction of the tire and a plurality of land portions defined by the circumferential main grooves, the tire being characterized in that the belt layer is formed by layering a pair of cross belts having oppositely signed belt angles of no less than 10° and no more than 45°, as an absolute value, and a circumferential reinforcing layer having a belt angle within a range of ±5° with respect to the circumferential direction of the tire, defining an end wear surface WE for the circumferential main grooves when viewed as a cross section from a meridian direction of the tire, a distance Dcc from the circumferential reinforcing layer to the end wear surface WE in the equatorial plane of the tire and a distance De from an edge of the circumferential reinforcing layer to the end wear surface WE have a relationship such that $1.06 \leq \text{De/Dcc}$, and a tire ground contact width Wg and a carcass cross-sectional width Wca of the carcass layer have a relationship such that $0.64 \leq \text{Wg/Wca} \leq 0.84$.

Additionally, a pneumatic tire according to the present technology is provided with a carcass layer, a belt layer disposed at the outer side of the carcass layer in the radial direction of the tire, and tread rubber disposed at the outer side of the belt layer in the radial direction of the tire, as well as at least three circumferential main grooves extending in a circumferential direction of the tire and a plurality of land portions defined by the circumferential main grooves, the tire being characterized in that the belt layer is formed by layering a pair of cross belts having oppositely signed belt angles of no less than 10° and no more than 45°, as an absolute value, and a circumferential reinforcing layer having a belt angle within a range of ±5° with respect to the circumferential direction of the tire, defining an end wear surface WE for the circumferential main grooves when viewed as a cross section from a meridian direction of the tire, a distance Dcc from the circumferential reinforcing layer to the end wear surface WE in the equatorial plane of the tire and a distance De from an edge of the circumferential reinforcing layer to the end wear surface WE have a relationship such that $1.06 \leq \text{De/Dcc}$, and a tire ground contact width Wg and a total tire width SW have a relationship such that $0.60 \leq \text{Wg/SW} \leq 0.80$.

In the pneumatic tire according to the present technology, (1) the distances Dcc, De of the circumferential reinforcing layer 145 with respect to the end wear surface WE are optimized so as to increase the contact patch pressure at the shoulder land portions when the tire is in contact with the ground. Thereby, braking performance when traveling on wet surfaces is improved, so as to advantageously improve the wet performance of the tire. Additionally, (2) the ratio Wg/Wca of the ground contact width Wg to the cross-sectional width Wca of the carcass layer 13 is optimized, so as advantageously further improve the tire wet performance.

Additionally, in a pneumatic tire according to the present technology, (1) the distances Dcc, De of the circumferential reinforcing layer 145 with respect to the end wear surface WE are optimized so as to increase the contact patch pressure at the shoulder land portions when the tire is in contact with the ground. Thereby, braking performance when traveling on wet surfaces is improved, so as to advantageously improving the wet performance of the tire. Additionally, (2) the ratio Wg/SW of the ground contact width Wg to the total tire width SW is optimized, so as advantageously further improve the tire wet performance.

BRIEF DESCRIPTION OF THE DRAWINGS

FIGS. 7A-7B include a table showing results of performance testing of pneumatic tires according to embodiments of the present technology.

FIGS. 8A-8B include a table showing results of performance testing of pneumatic tires according to embodiments of the present technology.

FIGS. 9A-9B include a table showing results of performance testing of pneumatic tires according to embodiments of the present technology.

FIGS. 10A-10B include a table showing results of performance testing of pneumatic tires according to embodiments of the present technology.

DETAILED DESCRIPTION

The present technology is described below in detail with reference to the accompanying drawings. However, the present technology is not limited to these embodiments. Additionally, components which can possibly or obviously be substituted while maintaining consistency with the present technology are included in components of the embodiments. Additionally, a plurality of modified examples that are described in the embodiment can be freely combined within a scope of obviousness for a person skilled in the art.

Pneumatic Tire

Figure 1:
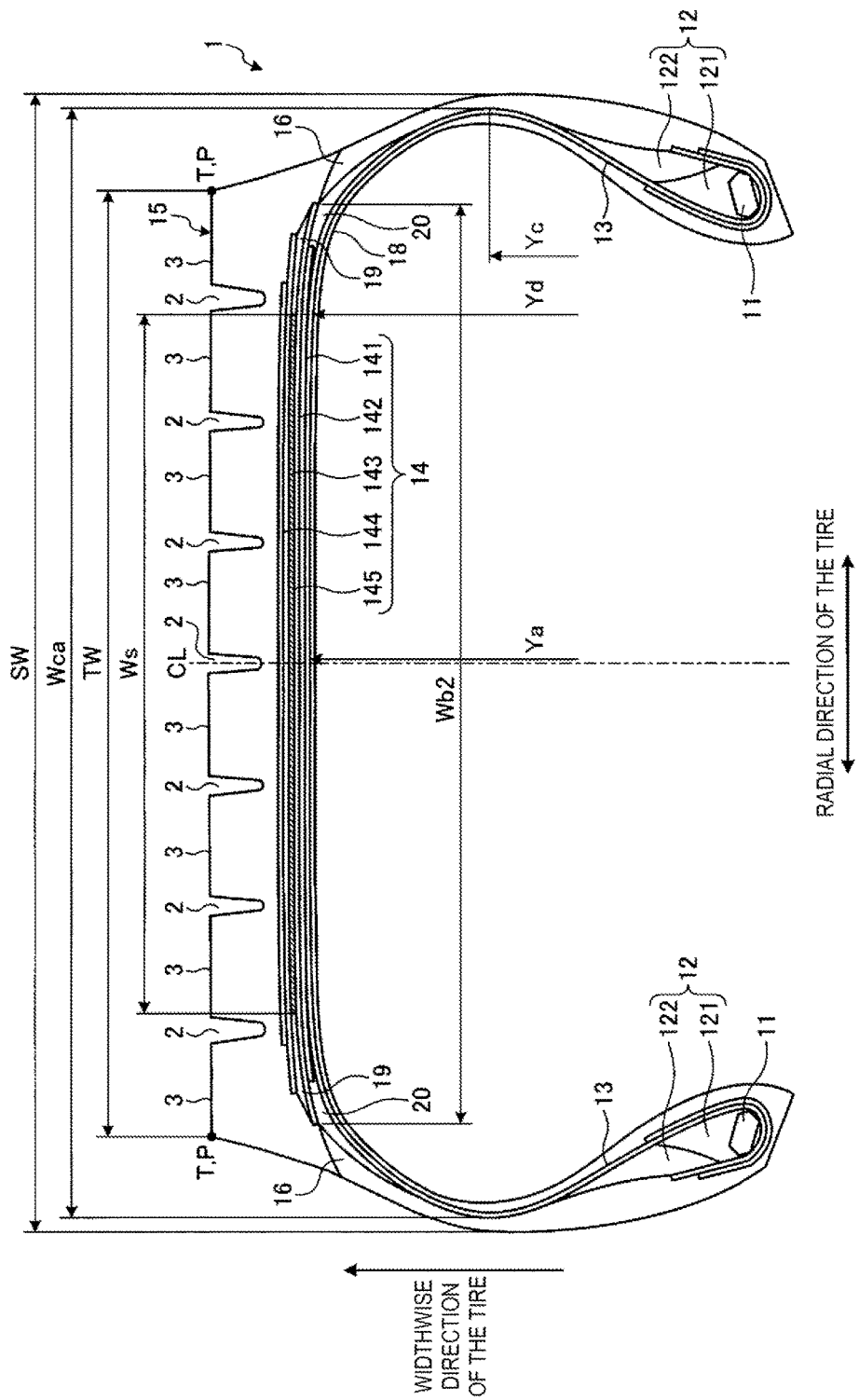
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. The drawing illustrates that a radial tire for heavy loads that is mounted on trucks, buses, and the like for long-distance transport as an example of the pneumatic tire 1. Note that the symbol CL refers to a tire equator plane. Additionally, a tread edge P and a tire ground contact edge T are in accord with each other in FIG. 1. Additionally, the circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and configure cores of left and right bead portions. The pair of bead fillers 12, 12 are formed from a lower filler 121 and an upper filler 122, and are disposed on an outer circumference of the pair of bead cores 11, 11 in the radial direction of the tire so as to reinforce the bead portions.

The carcass layer 13 stretches between the left and right side bead cores 11 and 11 in toroidal form, forming a framework for the tire. Additionally, both edges of the carcass layer 13 are folded from an inner side in a widthwise direction of the tire toward an outer side in the widthwise direction of the tire and fixed so as to wrap around the bead cores 11 and the bead fillers 12. Additionally, the carcass layer 13 is configured by a plurality of carcass cords formed from steel or organic fiber materials (e.g. nylon, polyester, rayon, or the like) covered by a coating rubber and subjected to a rolling process, and has a carcass angle (inclination angle of the carcass cord in a fiber direction with respect to the circumferential direction of the tire), as an absolute value, of no less than 85° and no more than 95°.

The belt layer 14 is formed by layering a plurality of belt plies 141 to 145, and disposed to extend over an outer circumference of the carcass layer 13. A detailed configuration of the belt layer 14 is described below.

The tread rubber 15 is disposed on an outer circumference in the radial direction of the tire of the carcass layer 13 and the belt layer 14, and forms a tread portion of the tire. The pair of side wall rubbers 16, 16 is disposed on each outer side of the carcass layer 13 in the widthwise direction of the tire, so as to form left and right sidewall portions of the tire.

Note that, in the configuration illustrated in FIG. 1, the pneumatic tire 1 includes seven circumferential main grooves 2 that extend in a circumferential direction of the tire, and eight land portions 3 defined and formed by the circumferential main grooves 2. Additionally, each of the land portions 3 is formed of ribs that continue in the circumferential direction of the tire or blocks that are segmented in the circumferential direction by lug grooves (not illustrated).

Here, "circumferential main grooves" refers to circumferential grooves having a groove width of no less than 5.0 mm. The groove width of the circumferential main grooves is measured excluding the notched portions and/or the chamfered portions formed at the groove opening portion.

Additionally, in the pneumatic tire 1, the left and right outermost circumferential main grooves 2, 2 in the widthwise direction of the tire are referred to as outermost circumferential main grooves. Additionally, the left and right land portions 3, 3 on the outer side in the widthwise direction of the tire that are defined by the left and right outermost circumferential main grooves 2, 2 are referred to as shoulder land portions.

[Belt Layer]

Figure 2:
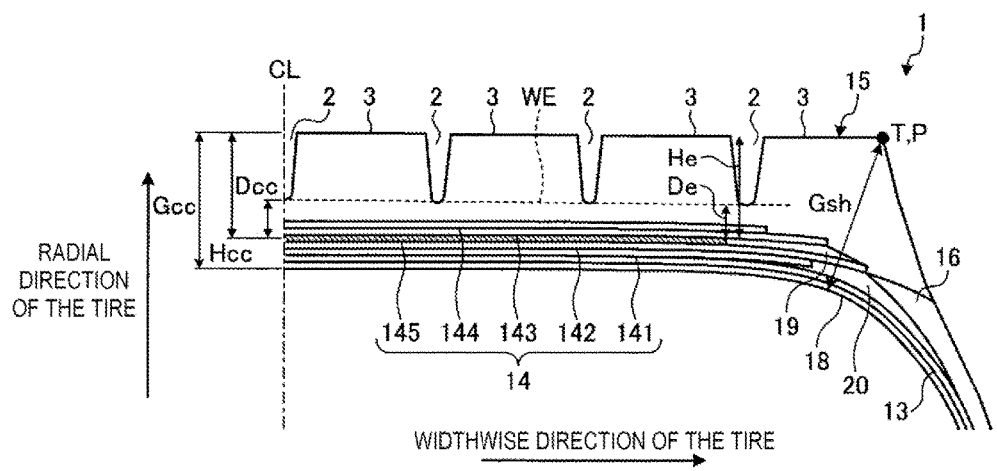
FIG. 2 is an explanatory view illustrating a belt layer of the pneumatic tire illustrated in FIG. 1.
Figure 3:
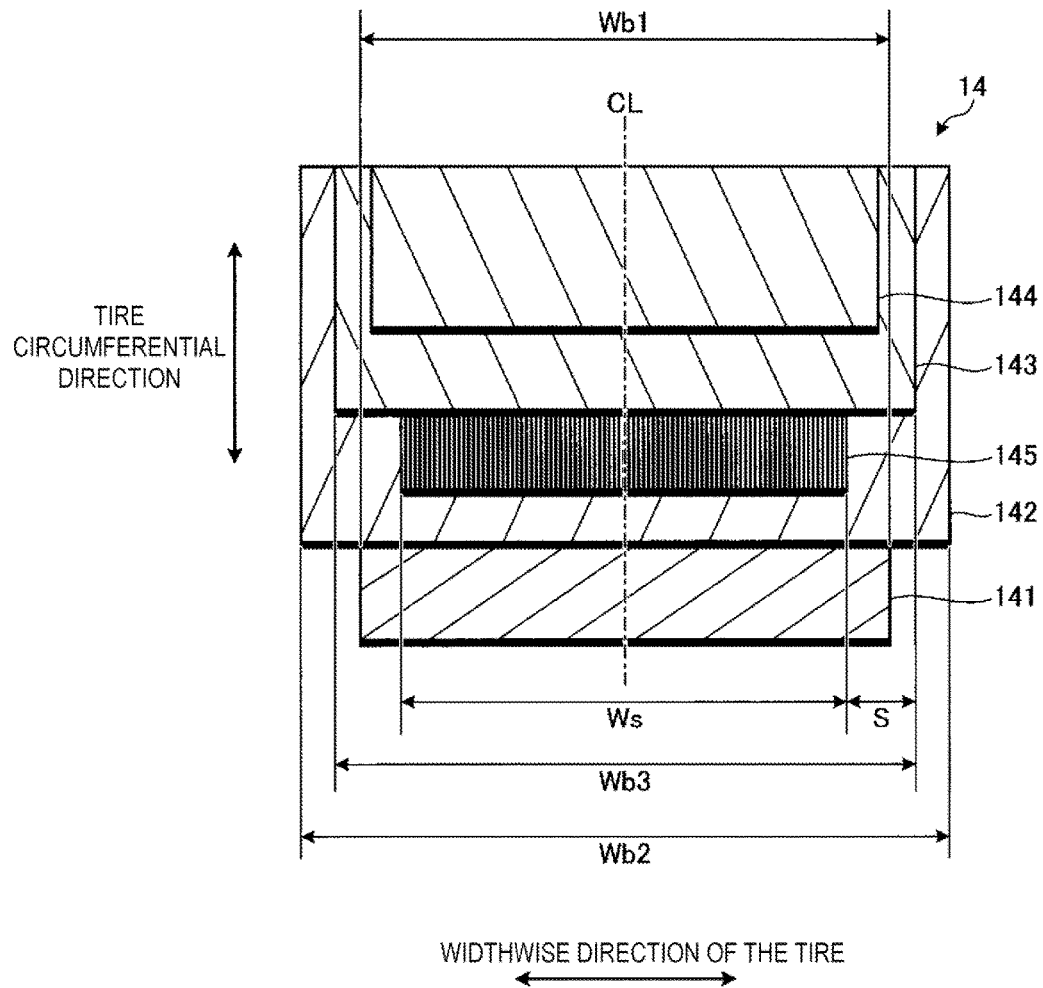
FIG. 3 is an explanatory view illustrating the belt layer of the pneumatic tire illustrated in FIG. 1.

FIGS. 2 and 3 are explanatory views illustrating a belt layer of the pneumatic tire illustrated in FIG. 1. Among these drawings, FIG. 2 illustrates an area on one side of a tread portion demarcated by the tire equatorial plane CL, and FIG. 3 illustrates a layered structure of the belt layer 14. Note that, the thin lines in the belt plies 141 to 145 in FIG. 3 schematically represent the respective belt cords of the belt plies 141 to 145.

The belt layer 14 is formed by layering a wide angle belt 141, a pair of cross belts 142, 143, a belt cover 144, and a circumferential reinforcing layer 145, and is disposed by being wound and mounted onto the outer circumference of the carcass layer 13 (see FIG. 2).

The wide angle belt 141 is configured by a plurality of belt cords formed from steel or organic fiber materials, covered by coating rubber, and subjected to a rolling process, having a belt angle (angle of inclination of the fiber direction of the belt cords with respect to the circumferential direction of the tire), as an absolute value, of no less than 45° and no more than 70°. Additionally, the wide angle belt 141 is disposed so as to be layered on the outer side of the carcass layer 13 in the radial direction of the tire.

The pair of cross belts 142, 143 are configured by a plurality of belt cords formed from steel or organic fiber materials, covered by coating rubber, and subjected to a rolling process, having a belt angle, as an absolute value, of no less than 10° and no more than 45°. Additionally, the pair of cross belts 142, 143 have belt angles that are of mutually opposite sign to each other, and are layered so that the fiber directions of the belt cords intersect each other (a crossply structure). In the following description, the cross belt 142 positioned on the inner side in the radial direction of the tire is referred to as "inner-side cross belt", and the cross belt 143 positioned on the outer side in the radial direction of the tire is referred to as "outer-side cross belt". Note that no less than three cross belts may be disposed so as to be layered (not illustrated). Additionally, in the present embodiment, the pair of cross belts 142, 143 is disposed so as to be layered on the outer side of the wide angle belt 141 in the radial direction of the tire.

Additionally, the belt cover 144 is configured by a plurality of belt cords formed from steel or organic fiber materials, covered by coating rubber, and subjected to a rolling process, having a belt angle, as an absolute value, of no less than 10° and no more than 45°. Additionally, the belt cover 144 is disposed so as to be layered on the outer side of the pair of cross belts 142, 143 in the radial direction of the tire. Note that, in this embodiment, the belt cover 144 has the same belt angle as the outer-side cross belt 143, and, additionally, is disposed in the outermost layer of the belt layer 14.

The circumferential reinforcing layer 145 is configured by belt cords formed from steel, and covered by coating rubber that are wound in a spiral manner with an inclination within a range of ±5° with respect to the circumferential direction of the tire. Additionally, in the present embodiment, the circumferential reinforcing layer 145 is disposed so as to be interposed between the pair of cross belts 142, 143. Additionally, the circumferential reinforcing layer 145 is disposed inward of left and right edges of the pair of cross belts 142, 143 in the widthwise direction of the tire. Specifically, the circumferential reinforcing layer 145 is formed by winding one or a plurality of wires in a spiral manner around the outer circumference of the inner-side cross belt 142. This circumferential reinforcing layer 145 reinforces the stiffness in the circumferential direction of the tire so as to improve the tire durability.

Note that, in the pneumatic tire 1, the belt layer 14 may have an edge cover (not illustrated). Generally, the edge cover is configured by a plurality of belt cords formed from steel or organic fiber materials covered by coating rubber and subjected to a rolling process, having a belt angle of no less than 0° and no more than 5°, as an absolute value. Additionally, edge covers are disposed respectively to the outer side of the left and right edge portions of the outer-side cross belt 143 (or the inner-side cross belt 142) in the radial direction of the tire. The difference in radial growth between the center region and the shoulder region of the tread portion is reduced, so as to improve uneven wear resistance of the tire due to a hoop effect demonstrated by the edge covers.

Additionally, in the configuration in FIG. 2, the circumferential reinforcing layer 145 is disposed so as to be interposed between the pair of cross belts 142, 143 (see FIG. 2). However, the circumferential reinforcing layer 145 is not limited as such, and may also disposed at the outer side of the pair of cross belts 142, 143 in the radial direction of the tire (not illustrated). Additionally, the circumferential reinforcing layer 145 may also be disposed inward of the pair of cross belts 142, 143. For example, the circumferential reinforcing layer 145 may be (1) disposed between the wide angle belt 141 and the inner-side cross belt 142, or (2) disposed between the carcass layer 13 and the wide angle belt 141 (not illustrated).

[Improving Wet Performance]

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the center region of the tread portion, and utilizing the hoop effect thereof, so as to suppress radial growth of the tread portion and to maintain the shape of the tread portion.

In this configuration, while the flat shape of the contact patch is maintained due to the circumferential reinforcing layer in the center region of the tread portion in the shoulder region of the tread portion, the tread portion may easily exhibit a shoulder drop shape at the region to the outer side in the widthwise direction of the tire from the edge of the circumferential reinforcing layer. As a result, there is a problem that the contact patch pressure at the shoulder land portions is reduced and the wet performance of the tire is reduced.

Accordingly, the pneumatic tire 1 employs the following configuration to improve wet performance (see FIGS. 1 to 3).

As illustrated in FIG. 2, an end wear surface WE for the circumferential main grooves 2 is defined when viewed as a cross section from a tire meridian direction. The end wear surface WE refers to the surface estimated from a wear indicator present in the tire. Additionally, the end wear surface WE is measured under the condition of a single tire with the tire in a non-inflated state. In a typical pneumatic tire, the end wear surface WE is on a curve that is substantially parallel with the tread profile.

The distance Dcc from the circumferential reinforcing layer 145 to the end wear surface WE in the equatorial plane CL of the tire and the distance De from an edge of the circumferential reinforcing layer 145 to the end wear surface WE preferably have a relationship such that $1.06 \leq De/Dcc$, more preferably $1.08 \leq De/Dcc$. There is no particular limitation on the maximum value for the ratio De/Dcc, but too high a value for the ratio De/Dcc is not preferable, as the tread rubber will generate increased levels of heat when the tire is rolling, negatively affecting the durability of the tire. Thus, the maximum value for the ratio is De/Dcc is preferably within the range, for example, $De/Dcc \leq 1.26$.

The distance Dcc and distance De are measured under the condition of a single tire with the tire in a non-inflated state. Additionally, the measurement point on the circumferential reinforcing layer 145 side is defined by a curve connecting the center points of the belt cords that configure the circumferential reinforcing layer 145, when viewed as a cross-section from the tire meridian direction. Additionally, the edge of the circumferential reinforcing layer 145 is defined by using the belt cord on the outermost side in the widthwise direction of the tire among the belt cords that configure the circumferential reinforcing layer 145 as a reference.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). Additionally, "specified inner pressure" refers to "maximum air pressure" defined by JATMA, a maximum value in "tire load limits at various cold inflation pressures" defined by TRA, and "inflation pressures" stipulated by ETRTO. Additionally, "specified load" refers to "maximum load capacity" defined by JATMA, a maximum value in "tire load limits at various cold inflation pressures" defined by TRA, and "load capacity" defined by ETRTO. However, with JATMA, in the case of passenger car tires, the specified internal pressure is an air pressure of 180 kPa, and the specified load is 88% of the maximum load capacity.

Additionally, the distance Gcc from the tread profile to the inner circumferential surface of the tire in the equatorial plane CL of the tire and the distance Gsh from the tread edge P to the inner circumferential surface of the tire preferably have a relationship such that $1.10 \leq Gsh/Gcc$, more preferably $1.20 \leq Gsh/Gcc$.

Figure 5:
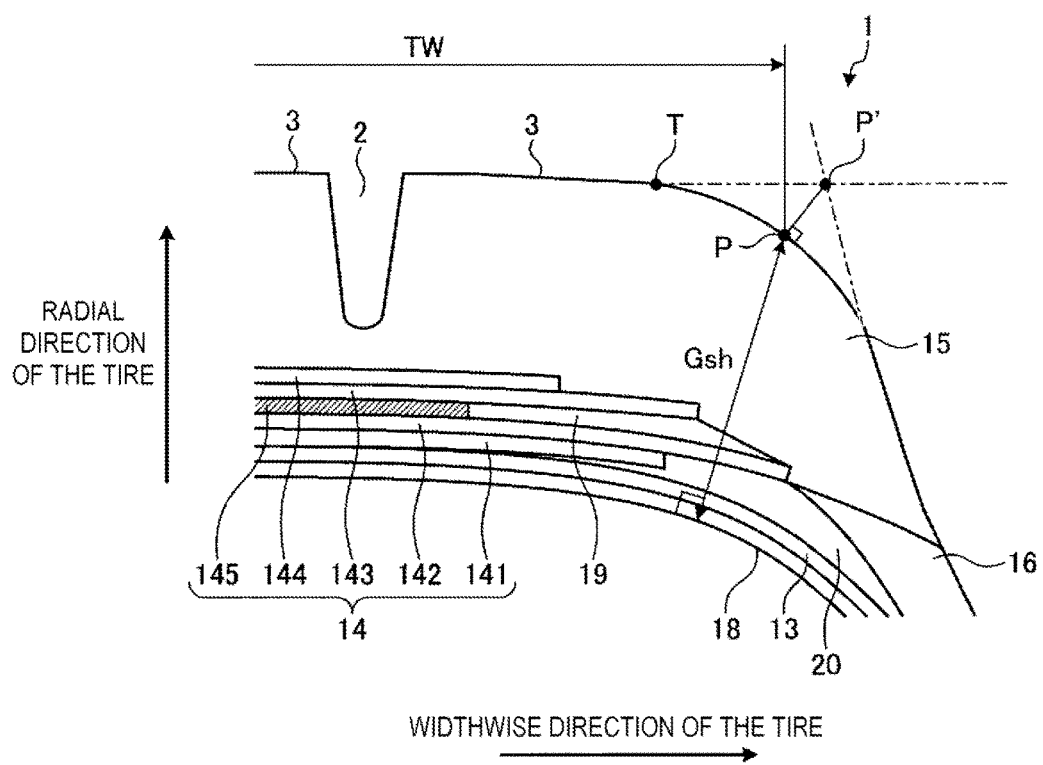
FIG. 5 is an explanatory view illustrating a modified example of the pneumatic tire illustrated in FIG. 1.

There is no particular limitation on the maximum value for the ratio Gsh/Gcc. However, the maximum value for the ratio Gsh/Gcc is preferably defined so that the radius at the tread edge P of the tread profile is no more than the radius at the equatorial plane CL of the tire when the tire is mounted on a specified rim and inflated to the specified inner pressure and is in an unloaded state. In other words, the maximum value for the ratio Gsh/Gcc is preferably defined so that the tread profile has an arcing or linear shape centered to the inner side in the radial direction of the tire and does not form an inverse letter-R shape (i.e., an arcing shape centered to the outer side in the radial direction of the tire). For example, in a configuration having a square shaped shoulder portion as in FIG. 2, the upper limit of the ratio Gsh/Gcc is approximately from 1.4 to 1.5. In a configuration having rounded should portions as shown in FIG. 5, to be described hereafter, the maximum value for the ratio Gsh/Gcc is about 1.3 to 1.4.

The distance Gcc is measured as the distance from the intersection between the tire equatorial plane CL and the tread profile to the intersection between the tire equatorial plane CL and the inner circumferential surface of the tire when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured excluding the circumferential main groove 2. The distance Gsh is measured as the length of a perpendicular line from the tread edge P to the inner circumferential surface of the tire when viewed as a cross-section from the tire meridian direction.

Note that, in the configuration illustrated in FIG. 2, the pneumatic tire 1 includes an inner liner 18 on the inner circumferential surface of the carcass layer 13, and the inner liner 18 is disposed across the entire region of the inner circumferential surface of the tire. In this configuration, the distance Gcc and the distance Gsh are measured by using the surface of the innerliner 18 (inner circumferential surface of the tire) as a reference.

The tread edge P refers to a point of the edge portion in a configuration having a (1) square shaped shoulder portion. For example, in the configuration illustrated in FIG. 2, the tread edge P and a tire ground contact edge T are in accord with each other due to the shoulder portion having a square shape. Conversely, (2) in a configuration having the round shaped shoulder portion, as illustrated in the modified example of FIG. 5 described below, taking an intersection P' between the tread portion profile and the side wall portion profile when viewed as a cross-section from the tire meridian direction, the tread edge P is taken as the bottom of a perpendicular line drawn from the intersection P' to the shoulder portion.

Note that, the "tire ground contact edge T" refers to the maximum width position in a tire axial direction at a contact patch between the tire and a flat plate when the tire is mounted on a specified rim, inflated to the specified inner pressure, placed perpendicularly to the flat plate in a static state, and loaded with a load corresponding to a specified load.

Additionally, in FIG. 1, the tire ground contact width Wg (not illustrated) and the cross-sectional width Wca of the carcass layer 13 preferably have a relationship such that $0.64 \leq Wg/Wca \leq 0.84$. Thereby, a ratio Wg/Wca of the tire ground contact width Wg to the cross-sectional width Wca of the carcass layer 13 is advantageously optimized.

The tire actual ground contact width Wg is calculated as the difference between the tire overall tire ground contact width and the sum of the groove widths of all the circumferential main grooves 2.

The ground contact width is measured as the sum of the distance along the tread surfaces of each of the land portions, when the tire is mounted on the specified rim, and inflated to the specified inner pressure.

The cross-sectional width Wca of the carcass layer 13 refers to a linear distance between the left and right maximum width positions of the carcass layer 13 when the tire is mounted on a specified rim and inflated to the specified inner pressure and is in an unloaded state.

Furthermore, In FIG. 1, the tire ground contact width Wg and the total tire width SW preferably have a relationship such that $0.60 \leq Wg/SW \leq 0.80$. Thereby, the ratio Wg/SW of the tire actual ground contact width Wg to the total tire width SW is optimized.

The total tire width SW refers to a linear distance (including all portions such as letters and patterns on the tire surface) between the side walls when the tire is mounted on a specified rim and inflated to the specified inner pressure and is in an unloaded state.

Additionally, in FIG. 1, the tire ground contact width Wg and the width Ws of the circumferential reinforcing layer 145 preferably have a relationship such that $1.00 \leq Wg/Ws \leq 1.25$. Thereby, a ratio Wg/Ws of the tire ground contact width Wg to the width Ws of the circumferential reinforcing layer 145 is optimized.

The width Ws of the circumferential reinforcing layer 145 is the distance from the left to the right edges of the circumferential reinforcing layer 145 in the tire rotational axis direction measured when the tire is mounted on a specified rim, inflated to the specified inner pressure, and is in an unloaded state. Additionally, if the structure of the circumferential reinforcing layer 145 is divided in the widthwise direction of the tire (not illustrated), the width Ws of the circumferential reinforcing layer 145 is the distance between the outermost edges of each of the divided sections.

Figure 4A:
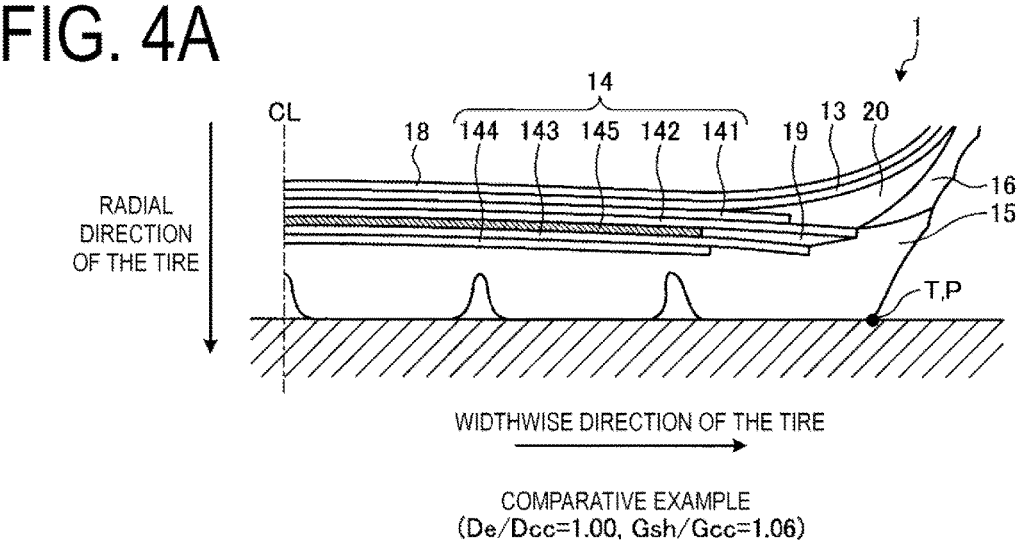
FIGS. 4A and 4B are explanatory views illustrating the effects of the pneumatic tire illustrated in FIG. 1.
Figure 4B:
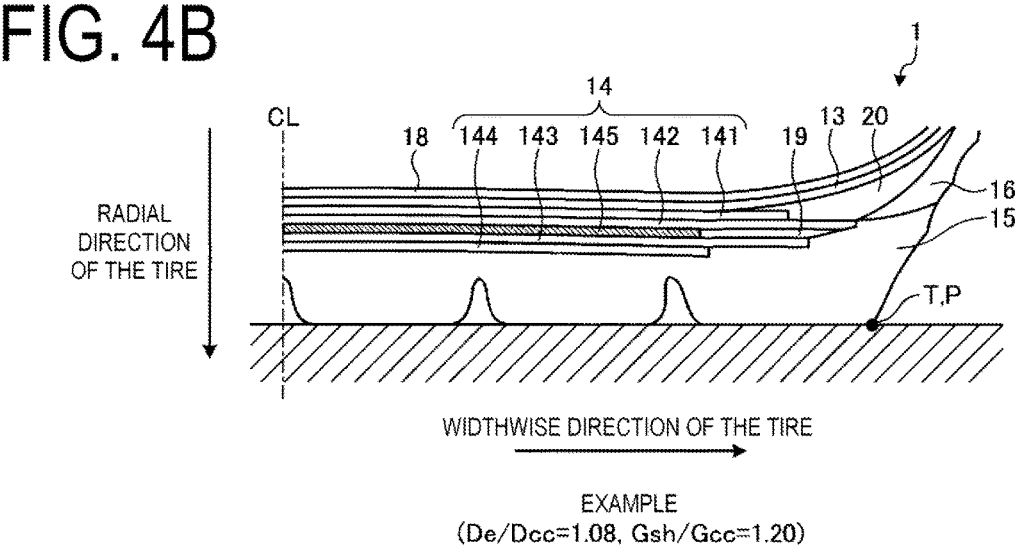

FIGS. 4A and 4B are an explanatory views illustrating the effects of the pneumatic tire illustrated in FIG. 1. The drawings illustrate tires having different De/Dcc and Gsh/Gcc ratios in contact with the ground.

The tire of the comparative example shown in FIG. 4A has the configuration shown in FIGS. 1 to 3, wherein the ratio De/Dcc is such that the two are equal (De/Dcc=1.00), and the ratio Gsh/Gcc is such that the latter is less than the former (Gsh/Gcc=1.06). In this configuration, the tread profile has a shoulder drop shape that decreases in external diameter from the equatorial plane CL of the tire toward the tread edge P when the tire is not in contact with the ground (not illustrated). As a result, the shoulder regions of the tread portion greatly deform on their road surface sides (i.e., the outer sides in the radial direction of the tire) when the tire is in contact with the ground, as shown in FIG. 4A. Because the distances Dcc, De from the circumferential reinforcing layer 145 to the end wear surface WE are uniform (De/Dcc=1.00), the edge of the circumferential reinforcing layer 145 exhibits a pronounced droop toward the road surface (i.e., the outer side in the radial direction of the tire) in conformity with the deformation of the shoulder regions of the tread portion. As a result, the circumferential reinforcing layer 145 is subjected to high levels of strain when in contact with the road.

By contrast, the tire of the example shown in FIG. 4B has the configuration shown in FIGS. 1 to 3, wherein the ratio De/Dcc is set so that the former is greater than the latter (De/Dcc=1.08), and the ratio Gsh/Gcc is set so that the former is greater than the latter (Gsh/Gcc=1.20). In this configuration, there is little difference between the outer diameter at the equatorial plane CL of the tire of the tread profile and the outer diameter at the tread edge P when then tire is not in contact with the ground, imparting the tread profile with an overall flat shape (i.e., substantially parallel to the rotational axis of the tire; see FIGS. 1 and 2). As a result, the shoulder regions of the tread portion exhibit little deformation when the tire is in contact with the ground, as shown in FIG. 4B. Furthermore, the distances Dcc, De from the circumferential reinforcing layer 145 to the end wear surface WE have the relationship such that De<Dcc, increasing contact patch pressure at the shoulder land portions when the tire is in contact with the ground compared to cases in which De and Dcc are substantially equal.

As discussed above, the configuration shown in FIG. 4B exhibits less deformation in the shoulder regions of the tread portion when the tire is in contact with the ground compared to the configuration shown in FIG. 4A. Thereby, the stiffness of the shoulder regions of the tread portion is ensured and additionally a suitable contact patch shape is ensured, so as to improve the wet performance of the tire. Additionally, the contact patch pressure at the shoulder land portions when the tire is in contact with the ground is increased, so as to improve the braking performance of the tire when traveling on wet roads.

[Round Shaped Shoulder Portion]

FIG. 5 is an explanatory view of a modified example of the pneumatic tire illustrated in FIG. 1. The drawing illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 5. In such a case, taking an intersection P' between the tread portion profile and the side wall portion profile when viewed as a cross-section from the tire meridian direction, the tread edge P is taken as the bottom of a perpendicular line drawn from the intersection P' to the shoulder portion. Therefore, the tire ground contact edge T and the tread edge P normally are in mutually different positions.

Additional Data

Additionally, in the pneumatic tire 1, in FIG. 1, the tread width TW and the width Ws of the circumferential reinforcing layer 145 preferably have a relationship such that $0.70 \leq Ws/TW \leq 0.90$.

The tread width TW is the distance in the direction of the tire rotational axis between the left and right tread edges P, P, measured when the tire is mounted on a specified rim, inflated to the specified inner pressure and is in an unloaded state.

Note that, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the above described range of the ratio Ws/TW of the width Ws of the circumferential reinforcing layer to the tread width TW is stipulated by conversion to half width by using the tire equatorial plane CL as a reference. Specifically, the distance TW' (not illustrated) from the tire equatorial plane CL to the tread edge P and the distance Ws' (not illustrated) from the tire equatorial plane CL to the edge of the circumferential reinforcing layer 145 are set satisfying the relationship $0.70 \leq Ws'/TW' \leq 0.90$.

Additionally, the tread width TW and the total tire width SW preferably have a relationship such that $0.79 \leq TW/SW \leq 0.89$, as shown in FIG. 1.

Additionally, the distance Hcc from the circumferential reinforcing layer 145 to the tread profile in the equatorial plane CL of the tire and the distance He from the edge of the circumferential reinforcing layer 145 to the tread profile preferably have a relationship such that $0.95 \leq He/Hcc \leq 1.20$, as shown in FIG. 2.

The distances Hcc and He are as measured when the tire is mounted on a specified rim and inflated to the specified inner pressure and is in an unloaded state. Additionally, the measurement point on the circumferential reinforcing layer 145 side is defined by a curve connecting the center points of the belt cords that configure the circumferential reinforcing layer 145, when viewed as a cross-section from the tire meridian direction. Additionally, the edge of the circumferential reinforcing layer 145 is defined by using the belt cord on the outermost side in the widthwise direction of the tire among the belt cords that configure the circumferential reinforcing layer 145 as a reference.

Additionally, a diameter Ya at the highest position of the carcass layer 13, a diameter Yc at the widest position of the carcass layer 13, and a diameter Yd of the carcass layer 13 at the edge of the circumferential reinforcing layer 145 have relationships such that $0.80 \leq Yc/Ya \leq 0.90$ and $0.95 \leq Yd/Ya \leq 1.02$ in FIG. 1. Thereby, the shape of the carcass layer 13 is optimized.

The diameter Ya of the highest position of the carcass layer 13 is measured as a distance from the tire rotational axis to the intersection between the tire equatorial plane CL and the carcass layer 13 when the tire is mounted on a specified rim, inflated to the specified inner pressure, and is in an unloaded state.

The diameter Yc of the widest position of the carcass layer 13 is measured as a distance from the tire rotational axis to the widest position of the carcass layer 13 when the tire is mounted on a specified rim, inflated to the specified inner pressure, and is in an unloaded state.

The radius Yd of the carcass layer 13 at the edge of the circumferential reinforcing layer 145 is measured as a distance from the tire rotational axis to a point Q3 (not illustrated), which is the intersection between the carcass layer 13 and a straight line drawn in the radial direction of the tire from the edge of the circumferential reinforcing layer 145, when the tire is mounted on a specified rim, inflated to the specified inner pressure, and is in an unloaded state.

Additionally, in this pneumatic tire 1, the groove area ratio A at the tire contact patch is preferably within a range $0.20 \leq AA \leq 0.30$. Thereby, the groove area ratio A is optimized.

The groove area ratio is defined as groove area/(groove area+ground contact area). "Groove area" refers to the opening area of the grooves at the contact patch. Additionally, "Groove" refers to the circumferential grooves and the lug grooves in the tread portion and does not include sipes, kerfs, and notches. Additionally, "Ground contact area" refers to the contact area between the tire and the road surface. Additionally, the groove area and the ground contact area are measured at a contact surface between a tire and a flat plate when the tire is mounted on a specified rim, inflated to the specified inner pressure, placed perpendicularly with respect to the flat plate in a static state, and loaded with a load corresponding to a specified load.

Additionally, in FIG. 1, the width Wb2 of the broad cross belt 142 and the cross-sectional width Wca of the carcass layer 13 preferably have a relationship such that $0.74 \leq Wb2/Wca \leq 0.89$, more preferably such that $0.78 \leq Wb2/Wca \leq 0.83$.

The width Ws of the circumferential reinforcing layer 145 and the cross-sectional width Wca of the carcass layer 13 preferably have a relationship such that $0.60 \leq Ws/Wca \leq 0.70$.

Additionally, the tread width TW and the cross-sectional width Wca of the carcass layer 13 preferably have a relationship such that $0.82 \leq TW/Wca \leq 0.92$.

The cross-sectional width Wca of the carcass layer 13 refers to a linear distance between the left and right maximum width positions of the carcass layer 13 when the tire is mounted on a specified rim and inflated to the specified inner pressure and is in an unloaded state.

Additionally, in FIG. 3, the width Wb3 of the narrow cross belt 143 and the width Ws of the circumferential reinforcing layer 145 preferably have a relationship such that $0.75 \leq Ws/Wb3 \leq 0.90$. Thereby, the suitable width Ws of the circumferential direction reinforcing layer 145 is ensured.

Additionally, as illustrated in FIG. 3, the circumferential reinforcing layer 145 is preferably disposed inward of the left and right edge portions of the narrower cross belt 143 of the pair of cross belts 142, 143 in the widthwise direction of the tire. Additionally, the width Wb3 of the narrower cross belt 143 and the distance S from the edge portion of the circumferential direction reinforcing layer 145 to the edge portion of the narrower cross belt 143 is preferably within a range 0.03≤S/Wb3≤0.12. Thereby, the suitable distance between the edges of the width Wb3 of the cross belt 143 and the edges of the circumferential reinforcing layer 145 is ensured. Note that, this point is the same even if the circumferential reinforcing layer 145 has a divided structure (not illustrated).

The distance S of the circumferential reinforcing layer 145 is measured as a distance in the widthwise direction of the tire when the tire is mounted on a specified rim, inflated to the specified inner pressure, and is in an unloaded state.

Note that, in the configuration in FIG. 1, the circumferential reinforcing layer 145 is configured by a single steel wire wound in a spiral manner, as illustrated in FIG. 3. However, the configuration is not limited thereto, and the circumferential reinforcing layer 145 may also be configured by a plurality of wires wound in a spiral manner around side-by-side to each other (multiple winding structure). In this case, preferably, the number of wires is no more than 5. Additionally, the width of winding per unit when five wires are wound in multiple layers is preferably no more than 12 mm. Thereby, a plurality of wires (no less than 2 and no more than 5 wires) can be wound properly with an inclination within a range of ±5° with respect to the circumferential direction of the tire.

Additionally, in the pneumatic tire 1, the width Wb1 of the wide angle belt 141 and the width Wb3 of the narrower cross belt 143 of the pair of cross belts 142, 143 preferably have a relationship of 0.85≤Wb1/Wb3≤1.05 (see FIG. 3). Thereby, the ratio Wb1/Wb3 is optimized.

The width Wb1 of the wide angle belt 141 and the width Wb3 of the cross belt 143 are measured as the distance in the widthwise direction of the tire when the tire is mounted on a specified rim, inflated to the specified inner pressure, and is in an unloaded state.

Note that, in the configuration of FIG. 1, the belt layer 14 has a structure with left-right symmetry centered on the tire equatorial plane CL as illustrated in FIG. 3, and additionally, the width Wb1 of the wide angle belt 141 and the width Wb3 of the narrower cross belt 143 have a relationship of Wb1<Wb3. As a result, an edge portion of the wide angle belt 141 is disposed inward of the edge portion of the narrower cross belt 143 in the widthwise direction of the tire on either side of the tire equatorial plane CL. However, the configuration is not limited thereto, and the width Wb1 of the wide angle belt 141 and the width Wb3 of the narrower cross belt 143 may have a relationship such that Wb1≥Wb3 (not illustrated).

Additionally, the belt cords of the wide angle belt 141 are preferably made of steel wire, and the wide angle belt preferably has the number of ends of no less than 15 and no more than 25 per 50 mm. Additionally, the belt cords of the pair of cross belts 142, 143 are configured by steel wire, and the pair of cross belts 142, 143 preferably has the number of ends of no less than 18 per 50 mm and no more than 28 per 50 mm, and more preferably no less than 20 per 50 mm and no more than 25 per 50 mm. Additionally, the belt cords that configure the circumferential reinforcing layer 145 are steel wire, and the circumferential reinforcing layer 145 preferably has the number of ends of no less than 17 per 50 mm and no more than 30 per 50 mm. Thereby, the suitable strengths of the belt plies 141, 142, 143, 145 are ensured.

Additionally, the 100% modulus R1 of the coating rubber of the wide angle belt 141 and the 100% modulus Es of the coating rubber of the circumferential reinforcing layer 145 preferably have a relationship such that 0.90≤Es/E1≤1.10. Additionally, moduli E2, E3 at 100% elongation of the coating rubbers of the pair of cross belts 142, 143, and the modulus Es at 100% elongation of the coating rubber of the circumferential reinforcing layer 145 preferably have a relationship of 0.90≤Es/E2≤1.10 and 0.90≤Es/E3≤1.10. Additionally, the modulus Es at 100% elongation of the coating rubber of the circumferential reinforcing layer 145 is preferably within the range of 4.5 MPa≤Es≤7.5 MPa. Thereby, the moduli of the belt plies 141, 142, 143, 145 are optimized.

The modulus at 100% elongation is measured in a tensile test at ambient temperature in conformance with JIS K6251 (using dumbbell no. 3).

Additionally, the break elongation λ1 of the coating rubber of the wide angle belt 141 is preferably within a range no less than 200%. Additionally, breaking elongations λ2, λ3 of the coating rubbers of the pair of cross belts 142, 143 are preferably within a range λ2≥200% and λ3≥200%. Additionally, a breaking elongation λs of the coating rubber of the circumferential reinforcing layer 145 is preferably within a range λs≥200%. Thereby, the suitable durability of the belt plies 141, 142, 143, 145 is ensured.

Breaking elongation is measured by performing a tensile test conforming to JIS-K7161 on a test sample of the JIS-K7162 specification 1B shape (dumb bell shape with a thickness of 3 mm) using a tensile tester (INSTRON5585H manufactured by Instron Corp.) at a pulling speed of 2 mm/min.

Additionally, elongation of the belt cords as tire components that configure the circumferential reinforcing layer 145 is preferably no less than 1.0% and no more than 2.5% when the tensile load is from 100 N to 300 N, and is preferably no less than 0.5% and no more than 2.0% when the tensile load is from 500 N to 1000 N as a tire (when removed from the tire). The belt cords (high elongation steel wire) have better elongation ratio than normal steel wire when a low load is applied, so they can withstand the loads that are applied to the circumferential reinforcing layer 145 during the time from manufacture until the tire is used, so it is possible to suppress damage to the circumferential reinforcing layer 145, which is preferable.

The elongation of the belt cord is measured in accordance with JIS G3510.

Additionally, in the pneumatic tire 1, the breaking elongation of the tread rubber 15 is preferably within a range no less than 350%. Thereby, the strength of the tread rubber 15 is assured, as to suppress the occurrence of tears in the outermost circumferential main groove 2. Note that, there is no particular limitation on the maximum breaking elongation of the tread rubber 15, but is constrained by the type of rubber compound of the tread rubber 15.

Additionally, in this pneumatic tire 1, the hardness of the tread rubber 15 preferably is within a range no less than 60. Thereby, a suitable strength of the tread rubber 15 is ensured. Note that, there is no particular limitation on the maximum hardness of the tread rubber 15, but is constrained by the type of rubber compound of the tread rubber 15.

Here, "rubber hardness" refers to JIS-A hardness in accordance with JIS-K6263.

Additionally, the tread rubber 15 of the pneumatic tire 1 preferably has a loss tangent tan δ within a range 0.10≤tan δ.

The loss tangent tan δ is measured by using a viscoelastic spectrometer under the conditions of a temperature of 20° C., a shearing strain of 10%, and a frequency of 20 Hz.

Belt Cushion

As illustrated in FIG. 2, the pneumatic tire 1 includes a belt cushion 20. The belt cushion 20 is disposed so as to be interposed between the carcass layer 13 and the edges of the cross belt 142 on the inner side of the pair of cross belts 142, 143 in the radial direction of the tire. For example, in the configuration in FIG. 2, an end portion of the belt cushion 20 on the outer side in the radial direction of the tire is inserted between the carcass layer 13 and the edge of the cross belt 142, and abuts the edge portion of the wide angle belt 141. Additionally, the belt cushion 20 extends inward in the radial direction of the tire along the carcass layer 13 and is disposed so as to be interposed between the carcass layer 13 and a sidewall rubber 16. Additionally, a pair of left and right belt cushions 20 are respectively disposed at the left and right side wall portions of the tire.

Additionally, a modulus Ebc at 100% elongation of the belt cushion 20 is within a range of 1.5 MPa≤Ebc≤3.0 MPa. Having the modulus Ebc within such a range, the belt cushion 20 exhibits the stress cushioning action, so as to suppress separation of the periphery rubber at the edges of the cross belt 142.

Additionally, a breaking elongation λbc of the belt cushion 20 within a range λbc≥400%. Thereby, a suitable durability of the belt cushion 20 is ensured.

[Belt Edge Cushion Two-Color Structure]

Figure 6:
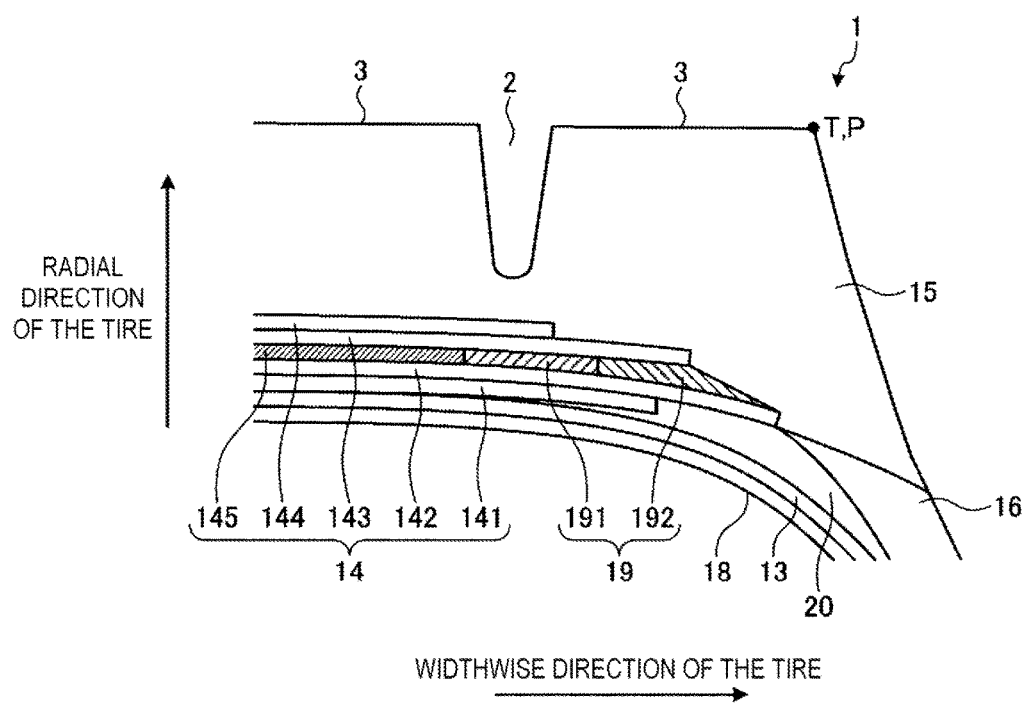
FIG. 6 is an explanatory view illustrating a modified example of the pneumatic tire illustrated in FIG. 1.

FIG. 6 is an explanatory view of a modified example of the pneumatic tire illustrated in FIG. 1. The drawing illustrates an enlarged view of an edge of the belt layer 14 on the outer side in the widthwise direction of the tire. Additionally, the circumferential reinforcing layer 145 and the belt edge cushion 19 in the drawing are indicated by hatching.

In the configuration illustrated in FIG. 1, the circumferential reinforcing layer 145 is disposed inward of the left and right edge portions of the narrower cross belt 143 of the pair of cross belts 142, 143 in the widthwise direction of the tire. Additionally, the belt edge cushion 19 is disposed so as to be interposed between the pair of cross belts 142, 143 at a position corresponding to the edge portion of the pair of cross belts 142, 143. Specifically, the belt edge cushion 19 is disposed at the outer side of the circumferential reinforcing layer 145 in the widthwise direction of the tire so as to be adjacent to the circumferential reinforcing layer 145, and extends from the edge on the outer side of the circumferential reinforcing layer 145 in the widthwise direction of the tire to the edge on the outer side of the pair of cross belts 142, 143 in the widthwise direction of the tire.

Additionally, in the configuration illustrated in FIG. 1, the belt edge cushion 19 has a structure that is thicker as a whole than the circumferential reinforcing layer 145 due to the thickness increasing toward the outer side in the widthwise direction of the tire. Additionally, the belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that 0.60≤E/Eco≤0.95. Thereby, the occurrence of separation of rubber materials between the pair of cross belts 142, 143 and in a region on the outer side of the circumferential reinforcing layer 145 in the widthwise direction of the tire is advantageously suppressed.

Conversely, according to the configuration in FIG. 6, the belt edge cushion 19 in the configuration in FIG. 1 has a two-color structure composed of a stress cushioning rubber 191 and an edge cushioning rubber 192. The stress cushioning rubber 191 is disposed between the pair of cross belts 142, 143 and at the outer side of the circumferential reinforcing layer 145 in the widthwise direction of the tire so as to be adjacent to the circumferential reinforcing layer 145. The edge cushioning rubber 192 is disposed between the pair of cross belts 142, 143 and on the outer side of the stress cushioning rubber 191 in the widthwise direction of the tire at a position corresponding to the edge portion of the pair of cross belts 142, 143 so as to be adjacent to the stress cushioning rubber 191. Therefore, when viewed as a cross-section from the tire meridian direction, the belt edge cushion 19 has a structure composed by disposing the stress cushioning rubber 191 and the edge cushioning rubber 192 side to side in the widthwise direction of the tire to fill a region from the edge of the circumferential reinforcing layer 145 on the outer side in the widthwise direction of the tire to the edge portion of the pair of cross belts 142, 143.

Additionally, a modulus Ein at 100% elongation of the stress cushioning rubber 191 and the modulus Es at 100% elongation of the coating rubber of the circumferential reinforcing layer 145 have a relationship such that Ein<Es in the configuration in FIG. 6. Specifically, the modulus Ein of the stress cushioning rubber 191 and the modulus Es of the circumferential reinforcing layer 145 preferably have a relationship such that 0.6≤Ein/Es≤0.9.

Additionally, a modulus Ein at 100% elongation of the stress cushioning rubber 191 and the modulus Eco at 100% elongation of the coating rubber of the cross belts 142, 143 have a relationship such that Ein<Eco in the configuration in FIG. 6. Specifically, the modulus Ein of the stress cushioning rubber 191 and the modulus Eco of the coating rubber preferably have a relationship such that 0.6≤Ein/Eco≤0.9.

Additionally a modulus Eout at 100% elongation of the edge cushioning rubber 192 and the modulus Ein at 100% elongation of the stress cushioning rubber 191 preferably have a relationship such that Eout<Ein in the configuration in FIG. 6. Additionally, the modulus Ein at 100% elongation of the stress cushioning rubber 191 preferably is within a range such that 4.0 MPa≤Ein≤5.5 MPa.

Since the stress cushioning rubber 191 is disposed at the outer side of the circumferential reinforcing layer 145 in the widthwise direction of the tire in the configuration of FIG. 6, shearing strain of the periphery rubbers between the edge portion of the circumferential reinforcing layer 145 and the cross belts 142, 143 is alleviated. Additionally, since the edge cushioning rubber 192 is disposed at a position corresponding to the edge portions of the cross belts 142, 143, shearing strain of the periphery rubbers at a position corresponding to the edge portions of the cross belts 142, 143 is alleviated. Accordingly, separation of the periphery rubber of the circumferential reinforcing layer 145 is suppressed.

Effect

As described above, the pneumatic tire 1 includes the carcass layer 13, the belt layer 14 disposed at the outer side of the carcass layer 13 in the radial direction of the tire, and the tread rubber 15 disposed at the outer side of the belt layer 14 in the radial direction of the tire (see FIG. 1). Additionally, the pneumatic tire 1 is provided with at least three circumferential main grooves 2 extending in the circumferential direction of the tire and a plurality of land portions 3 defined by the circumferential main grooves 2. Additionally, the belt layer 14 is formed by layering a pair of cross belts 142, 143 having oppositely signed belt angles of no less than 10° and no more 45°, as an absolute value, and a circumferential reinforcing layer 145 having a belt angle of ±5° with respect to the circumferential direction of the tire (see FIG. 2). Additionally, defining an end wear surface WE for the circumferential main grooves 2 when viewed as a cross section from a tire meridian direction, the distance Dcc from the circumferential reinforcing layer 145 to the end wear surface WE in the equatorial plane CL of the tire and the distance De from the edge of the circumferential reinforcing layer 145 to the end wear surface WE have a relationship such that $1.06 \leq De/Dcc$. Additionally, the tire ground contact width Wg (not illustrated) and the carcass cross-sectional width Wca of the carcass layer have a relationship such that $0.64 \leq Wg/Wca \leq 0.84$ (see FIG. 1).

In this configuration, (1) the distances Dcc, De of the circumferential reinforcing layer 145 with respect to the end wear surface WE are optimized so as to increase the contact patch pressure at the shoulder land portions when the tire is in contact with the ground. Thereby, braking performance when traveling on wet surfaces is improved, so as to advantageously improve the wet performance of the tire. Additionally, (2) the ratio Wg/Wca of the ground contact width Wg to the cross-sectional width Wca of the carcass layer 13 is optimized so as to advantageously further improve tire wet performance. Specifically, with Wg/Wca of no less than 0.64, a suitable tire ground contact area is ensured. Additionally, with Wg/Wca of no more than 0.84, the tread width TW is configured to keep from being excessively great, so as to ensure suitable contact patch pressure at the shoulder land portions 3.

Additionally, the present pneumatic tire 1 is provided with the carcass layer 13, the belt layer 14 disposed at the outer side of the carcass layer 13 in the radial direction of the tire, and the tread rubber 15 disposed at the outer side of the belt layer 14 in the radial direction of the tire (see FIG. 1). Additionally, the pneumatic tire 1 is provided with at least three circumferential main grooves 2 extending in the circumferential direction of the tire and a plurality of land portions 3 defined by the circumferential main grooves 2. Additionally, the belt layer 14 is formed by layering a pair of cross belts 142, 143 having oppositely signed belt angles of no less than 10° and no more 45°, as an absolute value, and a circumferential reinforcing layer 145 having a belt angle of ±5° with respect to the circumferential direction of the tire (see FIG. 2). Additionally, defining an end wear surface WE for the circumferential main grooves 2 when viewed as a cross section from a tire meridian direction, the distance Dcc from the circumferential reinforcing layer 145 to the end wear surface WE in the equatorial plane CL of the tire and the distance De from the edge of the circumferential reinforcing layer 145 to the end wear surface WE have a relationship such that $1.06 \leq De/Dcc$. Additionally, the tire ground contact width Wg and the total tire width SW have a relationship such that $0.60 \leq Wg/SW \leq 0.80$.

In this configuration, (1) the distances Dcc, De of the circumferential reinforcing layer 145 with respect to the end wear surface WE are optimized so as to increase the contact patch pressure at the shoulder land portions when the tire is in contact with the ground. Thereby, braking performance when traveling on wet surfaces is improved, so as to advantageously improve the wet performance of the tire. Additionally, (2) the ratio Wg/SW of the ground contact width Wg to the total tire width SW is optimized so as to advantageously further improve tire wet performance. Specifically, with Wg/SW of no less than 0.60, a suitable tire ground contact area is ensured. Additionally, having Wg/SW of no more than 0.80, the tread width TW is configured to keep from being excessively great, so as to ensure suitable contact patch pressure at the shoulder land portions 3 is ensured.

Additionally, in this pneumatic tire 1, the distance Gcc from the tread profile to the inner circumferential surface of the tire along the tire equatorial plane CL, and the distance Gsh from the tread edge P to the inner circumferential surface of the tire have a relationship such that $1.10 \leq Gsh/Gcc$ (see FIG. 2). In this configuration, the tread profile has an overall flat shape when the tire is not in contact with the ground (see FIGS. 1 and 2), so as to reduce the amount of deformation in the shoulder regions of the tread portion when the tire is in contact with the ground (compare FIGS. 4(*a*) and 4(*b*)). Thereby, separation of the circumferential rubber of the circumferential reinforcing layer 145 is advantageously suppressed more effectively. Additionally, repetitive stress on the edges of the circumferential reinforcing layer 145 when the tire is rolling is reduced, so as to advantageously suppress breakage of the belt cords of the circumferential reinforcing layer 145.

Additionally, in this pneumatic tire 1, the tire ground contact width Wg and the width Ws of the circumferential reinforcing layer 145 have a relationship such that $1.00 \leq Wg/Ws \leq 1.25$. Thereby, a ratio Wg/Ws of the tire ground contact width Wg to the width Ws of the circumferential reinforcing layer 145 is advantageously optimized. Specifically, with Wg/Ws of no less than 1.00, suitable functioning on the part of the circumferential reinforcing layer 145 is ensured. Specifically, the width Ws of the circumferential reinforcing layer 145 is ensured, so as to suppress ruffling in the tread portion near the edges of the circumferential reinforcing layer 145 (¼ the region of the tread width TW). Thereby, suitable contact patch pressure at the shoulder land portions 3 is ensured, improving the wet performance of the tire. Additionally, with Wg/Ws of no more than 1.25, fatigue breakage of the belt cords in the edge portions of the circumferential reinforcing layer 145 is suppressed. Specifically, setting a maximum value for the width Ws of the circumferential reinforcing layer 145 prevents an excessive difference in diameter between the central section and the edge of the circumferential reinforcing layer 145. Thereby, tension on the circumferential reinforcing layer 145 due to the repetitive strain when the tire is rolling is reduced, so as to suppress breakage of the belt cords of the circumferential reinforcing layer 145.

Additionally, in the pneumatic tire 1, the tread width TW and a cross-sectional width Wca of the carcass layer 13 have a relationship such that $0.82 \leq TW/Wca \leq 0.92$ (see FIG. 1). A ratio TW/Wca of the tread width TW to the cross-sectional width Wca of the carcass layer 13 is advantageously optimized. Specifically, with TW/Wca of no less than 0.82, differences in radial growth between the central region and the shoulder regions are mitigated, so as to advantageously make the ground contract pressure distribution in the widthwise direction of the tire uniform. Thereby, loads on the belt layer 14 are dispersed, so as to improve the durability of the tire. Additionally, with TW/Wca of no more than 0.92, ruffling in the shoulder portion is suppressed, so as to suppress deformation when the tire makes ground contact, and to effectively distribute a load on the belt layer 14.

Additionally, in this pneumatic tire 1, the tread width TW and the total tire width SW have a relationship such that $0.79 \leq TW/SW \leq 0.89$ (see FIG. 1). In this configuration, radial growth in the center region is suppressed due to the belt layer 14 having the circumferential reinforcing layer 145. Furthermore, a difference in radial growths between the center region and a shoulder region is alleviated due to the ratio TW/SW being within the above described range. Thereby, the ground contact pressure distribution of the tire is advantageously made uniform. Specifically, with TW/SW of no less than 0.79, the air volume inside the tire is ensured and deformation is suppressed. Additionally, with TW/SW of no more than 0.89, ruffling in the shoulder portion is suppressed, so as to suppress deformation when the tire makes ground contact.

Additionally, in the pneumatic tire 1, a width Ws of the circumferential reinforcing layer 145 and a cross-sectional width Wca of the carcass layer 13 have a relationship such that $0.60 \leq Ws/Wca \leq 0.70$ (see FIG. 1). Thereby, the ratio Ws/Wca of the width Ws of the circumferential reinforcing layer 145 to the width Wca of the carcass layer 13 is advantageously optimized. Specifically, with Ws/Wca of no more than 0.60, suitable functioning on the part of the circumferential reinforcing layer 145 is ensured. Specifically, the width Ws of the circumferential reinforcing layer 145 is ensured, so as to suppress ruffling in the tread portion near the edges of the circumferential reinforcing layer 145 (¼ the region of the tread width TW). Thereby, suitable contact patch pressure at the shoulder land portions 3 is ensured, so as to improve the wet performance of the tire. Additionally, with Ws/Wca of no more than 0.70, fatigue breakage of the belt cords in the edge portions of the circumferential reinforcing layer 145 is suppressed. Specifically, setting a maximum value for the width Ws of the circumferential reinforcing layer 145 prevents an excessive difference in diameter between the central section and the edge of the circumferential reinforcing layer 145. Thereby, tension on the circumferential reinforcing layer 145 due to the repetitive strain when the tire is rolling is reduced, so as to suppress breakage of the belt cords of the circumferential reinforcing layer 145.

Additionally, in this pneumatic tire 1 the width Wb2 of the broad cross belt 142 and the cross-sectional width Wca of the carcass layer 13 have a relationship such that $0.74 \leq Wb2/Wca \leq 0.89$ (see FIG. 1). Thereby, the width Wb2 of the broad cross belt 142 is optimized, so as to advantageously ensure the stiffness of the tread portion.

Additionally, in the pneumatic tire 1, the radius Ya at the highest position of the carcass layer 13 and the radius Yd of the carcass layer 13 at the edge of the circumferential reinforcing layer 145 have a relationship such that $0.95 \leq Yd/Ya \leq 1.02$ (see FIG. 1). Thereby, a shape for the carcass layer 13 is optimized, so as to advantageously reduce the amount of deformation in the carcass layer 13 in the region in which the circumferential reinforcing layer 145 is disposed when the tire is in contact with the ground. Specifically, with Yd/Ya of no more than 0.95, the amount of deformation in the carcass layer 13 in the region in which the circumferential reinforcing layer 145 is disposed is reduced when the tire is in contact with the ground. Additionally, with Yd/Ya of no more than 1.02, a suitable tire shape is ensured.

Additionally, in this pneumatic tire 1, the distance Hcc from the circumferential reinforcing layer 145 to the tread profile in the equatorial plane CL of the tire and the distance He from the edge of the circumferential reinforcing layer 145 to the tread profile have a relationship such that $0.95 \leq He/Hcc \leq 1.20$ (see FIG. 2). In this configuration, a positional relationship (ratio He/Hcc) between the circumferential reinforcing layer 145 and the tread profile is optimized, so as to reduce strain in the circumferential reinforcing layer 145 when the tire is in contact with the ground. Thereby, tension on the circumferential reinforcing layer 145 due to the repetitive strain when the tire is rolling is reduced, so as to suppress breakage of the belt cords of the circumferential reinforcing layer 145.

Additionally, a groove area ratio A at the tire contact patch in the pneumatic tire 1 is within a range $0.20 \leq A \leq 0.30$. Thereby, the groove area ratio A is advantageously optimized. Specifically, with A of no more than 0.20, the groove area in the tire contact patch is ensured, so as to ensure the wet performance of the tire. Additionally, with A of no more than 0.30, ground contact area is ensured, so as to ensure the resistance of the tire to uneven wear.

Additionally, in the pneumatic tire 1, a loss tangent tan δ of the tread rubber 15 is within a range $0.10 \leq \tan \delta$. Thereby, the suitable loss tangent tan δ of the tread rubber 15 is ensured, so as to advantageously improve the wet performance of the tire.

Additionally, in the pneumatic tire 1, the belt cords of the circumferential reinforcing layer 145 are steel wire, and the circumferential reinforcing layer 145 has the number of ends of no less than 17 per 50 mm and no more than 30 per 50 mm. Thereby, the number of ends of the belt cords of the circumferential reinforcing layer 145 is advantageously optimized. Specifically, with the number of ends of no less than 17 per 50 mm, a suitable level of strength on the part of the circumferential reinforcing layer 145 is ensured. Additionally, with the number of ends of no more than 30 per 50 mm, a suitable amount of rubber for the coating rubber of the circumferential reinforcing layer 145 is ensured, so as to suppress separation of the rubber material between adjacent belt plies (in FIG. 3, between the pair of cross belts 142, 143 and the circumferential reinforcing layer 145).

Additionally, in the pneumatic tire 1, the elongation of the belt cords from which the circumferential reinforcing layer 145 is configured as tire components when a tensile load of 100 N to 300 N is no less than 1.0% and no more than 2.5%. Thereby, the suitable effect of suppressing radial growth in the center region is advantageously ensured due to the circumferential reinforcing layer 145.

Additionally, in the pneumatic tire 1, the elongation of the belt cords from which the circumferential reinforcing layer 145 is configured as a tire when a tensile load of 500 N to 1000 N is no less than 0.5% and no more than 2.0%. Thereby, the suitable effect of suppressing radial growth in the center region is advantageously ensured due to the circumferential reinforcing layer 145.

Additionally, in the pneumatic tire 1, the circumferential reinforcing layer 145 is disposed inward of the left and right edge portions of the narrower cross belt 143 of the pair of cross belts 142, 143 (see FIG. 3) in the widthwise direction of the tire. Additionally, the pneumatic tire 1 includes the stress cushioning rubber 191 disposed between the pair of cross belts 142, 143 and at the outer side of the circumferential reinforcing layer 145 in the widthwise direction of the tire and adjacent to the circumferential reinforcing layer 145, and the edge cushioning rubber 192 disposed between the pair of cross belts 142, 143 and at a position at the outer side of the stress cushioning rubber 191 in the widthwise direction of the tire and at a position corresponding to the edge portions of the pair of cross belts 142, 143 (see FIG. 6). In this configuration, fatigue rupture of the periphery rubber at the edge portion of the circumferential reinforcing layer 145 is advantageously suppressed due to the circumferential reinforcing layer 145 being disposed inward of the left and right edge portions of the narrower cross belt 143 of the pair of cross belts 142, 143 in the widthwise direction of the tire. Additionally, since the stress cushioning rubber 191 is disposed at the outer side of the circumferential reinforcing layer 145 in the widthwise direction of the tire, shearing strain of the periphery rubber between the edge portion of the circumferential reinforcing layer 145 and the cross belts 142, 143 is alleviated. Additionally, since the edge cushioning rubber 192 is disposed at a position corresponding to the edge portions of the cross belts 142, 143, shearing strain of the periphery rubbers at a position corresponding to the edge portions of the cross belts 142, 143 is alleviated. Accordingly, separation of the periphery rubber of the circumferential reinforcing layer 145 is advantageously suppressed.

Additionally, in the pneumatic tire 1, the modulus Ein at 100% elongation of the stress cushioning rubber 191 and the modulus Eco at 100% elongation of the coating rubber of the pair of cross belts 142, 143 have a relationship such that Ein<Eco. Thereby, the modulus Ein of the stress cushioning rubber 191 is optimized so as to advantageously alleviate the shearing strain of the periphery rubber between the edge portion of the circumferential reinforcing layer 145 and the cross belts 142, 143.

Additionally, in the pneumatic tire 1, the modulus Ein at 100% elongation of the stress cushioning rubber 191 and the modulus Eco at 100% elongation of the coating rubber of the pair of cross belts 142, 143 have a relationship such that $0.6 \leq Ein/Eco \leq 0.9$. Thereby, the ratio Ein/Eco is optimized, so as to advantageously alleviate the shearing strain of the peripheral rubber between the edge portion of the circumferential reinforcing layer 145 and the cross belts 142, 143.

Additionally, in the pneumatic tire 1, the modulus Ein at 100% elongation of the stress cushioning rubber 191 is within a range such that $4.0 \text{ MPa} \leq Ein \leq 5.5 \text{ MPa}$ (see FIG. 6). Thereby, the modulus Ein of the stress cushioning rubber 191 is optimized, so as to advantageously alleviate the shearing strain of the periphery rubber between the edge portion of the circumferential reinforcing layer 145 and the cross belts 142, 143.

Additionally, in the pneumatic tire 1, the circumferential reinforcing layer 145 is disposed inward of the left and right edge portions of the narrower cross belt 143 of the pair of cross belts 142, 143 (see FIG. 3) in the widthwise direction of the tire. Additionally, the width Wb3 of the narrower cross belt 143 and the distance S from the edge portion of the circumferential reinforcing layer 145 to the edge portion of the narrower cross belt 143 are in a range $0.03 \leq S/Wb3 \leq 0.12$. Thereby, a positional relationship S/Wb3 between the edge portions of the cross belts 142, 143 and the edge portions of the circumferential reinforcing layer 145 is advantageously optimized. Specifically, with S/Wb3 of no less than 0.03, a suitable distance between the edge of the circumferential reinforcing layer 145 and the edges of the cross belt 143 is ensured, so as to suppress the separation of the periphery rubbers at the edges of these belt plies 145, 143. Additionally, with S/Wb3 of no more than 0.12, the width Ws of the circumferential reinforcing layer 145 relative to the width Wb3 of the cross belt 143 is ensured, so as to ensure a suitable hoop effect from the circumferential reinforcing layer 145.

Target of Application

Additionally, the pneumatic tire 1 is preferably applied to a heavy duty tire with an aspect ratio of no less than 40% and no more than 70% when mounted on a regular rim, inflated to a regular inner pressure and a regular load is applied. A heavy duty tire has a higher load under use than a passenger car tire. As a result, the difference in the diameters between the disposition region of the circumferential reinforcing layer 145 at the tread surface and the region on the outer side in the widthwise direction of the tire from the circumferential reinforcing layer 145 may easily increase. Additionally, a ground contact shape having an hourglass shape occurs easily in the tire having the above described low aspect ratio. Dramatic improvement in the wet performance of the tire described above can be obtained by applying the technology to a tire for heavy loads of this sort.

EXAMPLES

FIGS. 7A to 10B are tables showing results of performance testing of pneumatic tires according to embodiments of the present technology.

Performance tests were executed by evaluating the wet performance of a plurality of different pneumatic tires (see FIGS. 7A to 10B). In this evaluation, pneumatic tires having a tire size of 315/60 R22.5 were mounted on a rim having a rim size of 22.5×9.00 and inflated with 900 kPa of air pressure. Additionally, the pneumatic tires were mounted on a 2-D (2 front wheels-rear-wheel drive) vehicle as a test vehicle and a load of 30.89 kN was applied to the pneumatic tires.

Evaluations pertaining to wet performance involved driving the test vehicle on the wet road surface having the pneumatic tires mounted thereon and measuring the braking distance from an initial speed of 60 km/h. Based on the measurement results, index evaluation is carried out, by using the conventional example as a reference (100). A larger numerical value is better in the evaluations. Specifically, an evaluation of no less than 105 (no less than +5 points over the reference value of 100) indicates sufficient superiority over the conventional example, and an evaluation of no less than 110 indicates dramatic superiority over the conventional example.

The pneumatic tires 1 of Working Example 1 had the configuration illustrated in FIGS. 1 to 3. Additionally, the belt angle of the cross belts 142, 143 was ±19°, and the belt angle of the circumferential reinforcing layer 145 was substantially 0°. Additionally, the main dimensions were set at TW=275 mm, Gcc=32.8 mm, Dcc=11.2 mm, Hcc=21.3 mm, and Wca=320 mm. The pneumatic tires 1 of Working Examples 2 to 58 are modified examples of the pneumatic tire of Working Example 1.

In the configuration of FIGS. 1 to 3, the pneumatic tire of the Conventional Example does not have a circumferential reinforcing layer 145.

As can be seen from the test results, the pneumatic tires 1 of the Working Examples 1 to 58 demonstrate improved belt-edge-separation resistance performance of the tire. Additionally, in particular, a comparison between Working Examples 1 and 2 shows that adopting values of $1.20 \leq Gsh/Gcc$, $1.08 \leq De/Dcc$, and $0.64 \leq Wg/Wca \leq 0.84$ yields superior effects (i.e., a rating of no less than 105) for wet performance. Additionally, a comparison between Working Examples 27 and 28 shows that adopting values of $1.20 \leq Gsh/Gcc$, $1.08 \leq De/Dcc$, $0.60 \leq Wg/SW \leq 0.80$ yields superior effects (i.e., a rating of 105 or higher) for wet performance.

What is claimed is:

1. A pneumatic tire comprising:
    a carcass layer;
    a belt layer disposed at an outer side of the carcass layer in a radial direction of the tire;
    a tread rubber disposed at an outer side of the belt layer in the radial direction of the tire;
    at least three circumferential main grooves extending in a circumferential direction of the tire; and
    a plurality of land portions defined by the circumferential main grooves;
    the belt layer being formed by layering a pair of cross belts having a belt angle of no less than 10° and no more than 45°, as an absolute value and having belt angles of mutually opposite signs, and a circumferential reinforcing layer having a belt angle within a range of ±5° with respect to the circumferential direction of the tire;

when defining an end wear surface WE for the circumferential main grooves when viewed as a cross section from a meridian direction of the tire, a distance Dcc from the circumferential reinforcing layer to the end wear surface WE in an equatorial plane of the tire and a distance De from an edge of the circumferential reinforcing layer to the end wear surface WE having a relationship such that $1.06 \leq De/Dcc$;

a tire ground contact width W g and a carcass cross-sectional width Wca of the carcass layer having a relationship such that $0.64 \leq Wg/Wca \leq 0.84$; and a width Wb2 of a broader of the pair of cross belts and a cross-sectional width W ca of the carcass layer having a relationship such that $0.74 \leq Wb2/Wca \leq 0.85$;

wherein a distance Hcc from the circumferential reinforcing layer to a tread profile in the equatorial plane of the tire and a distance He from an edge of the circumferential reinforcing layer to the tread profile have a relationship $1.11 < He/Hcc < 1.20$.

2. A pneumatic tire comprising:

a carcass layer;

a belt layer disposed at an outer side of the carcass layer in a radial direction of the tire;

a tread rubber disposed at an outer side of the belt layer in the radial direction of the tire;

at least three circumferential main grooves extending in a circumferential direction of the tire; and a plurality of land portions defined by the circumferential main grooves;

the belt layer being formed by layering a pair of cross belts having a belt angle of no less than 10° and no more than 45°, as an absolute value and having belt angles of mutually opposite signs, and a circumferential reinforcing layer having a belt angle within a range of ±5° with respect to the circumferential direction of the tire;

when defining an end wear surface WE for the circumferential main grooves when viewed as a cross section from a meridian direction of the tire, a distance Dcc from the circumferential reinforcing layer to the end wear surface WE in an equatorial plane of the tire and a distance De from an edge of the circumferential reinforcing layer to the end wear surface WE having a relationship such that $1.06 \leq De/Dcc$;

a tire ground contact width W g and a total tire width SW having a relationship such that $0.60 \leq Wg/SW \leq 0.80$; and a width Wb2 of a broader of the pair of cross belts and a cross-sectional width Wca of the carcass layer having a relationship such that $0.74 \leq Wb2/Wca \leq 0.85$;

wherein a distance Hcc from the circumferential reinforcing layer to a tread profile in the equatorial plane of the tire and a distance He from an edge of the circumferential reinforcing layer to the tread profile have a relationship $1.11 \leq He/Hcc \leq 1.20$.

3. The pneumatic tire according to claim 2, wherein a distance Gcc from a tread profile to an inner circumferential surface of the tire at a tire equatorial plane, and a distance Gsh from a tread edge to the inner circumferential surface of the tire have a relationship such that $1.10 \leq Gsh/Gcc$.

4. The pneumatic tire according to claim 2, wherein the tire ground contact width Wg and a width Ws of the circumferential reinforcing layer have a relationship such that $1.00 \leq Wg/Ws \leq 1.25$.

5. The pneumatic tire according to claim 2, wherein a tread width TW and a cross-sectional width Wca of the carcass layer have a relationship such that $0.82 \leq TW/Wca \leq 0.92$.

6. The pneumatic tire according to claim 2, wherein a tread width TW and a total tire width SW have a relationship such that $0.79 \leq TW/SW \leq 0.89$.

7. The pneumatic tire according to claim 2, wherein a width Ws of the circumferential reinforcing layer and a cross-sectional width Wca of the carcass layer have a relationship such that $0.60 \leq Ws/Wca \leq 0.70$.

8. The pneumatic tire according to claim 2, wherein a diameter Ya of a highest position of the carcass layer and a diameter Yd of the carcass layer at the circumferential reinforcing layer have a relationship such that $0.95 \leq Yd/Ya \leq 1.02$.

9. The pneumatic tire according to claim 2, wherein a groove area ratio A at a tire contact patch is within a range $0.20 \leq A$.

10. The pneumatic tire according to claim 2, wherein a loss tangent $\tan \delta$ of the tread rubber is within a range $0.10 \leq \tan \delta$.

11. The pneumatic tire according to claim 2, wherein belt cords of the circumferential reinforcing layer are steel wire and have a number of ends of no less than 17 per 50 mm and no more than 30 per 50 mm.

12. The pneumatic tire according to claim 2, wherein elongation of belt cords as tire components is no less than 1.0% and no more than 2.5% when a tensile load is from 100 N to 300 N, the belt cords configuring the circumferential reinforcing layer.

13. The pneumatic tire according to claim 2, wherein elongation of belt cords as a tire is no less than 0.5% and no more than 2.0% when a tensile load is no less than 500 N and no more than 1000 N, the belt cords configuring the circumferential reinforcing layer.

14. The pneumatic tire according to claim 2, wherein the circumferential reinforcing layer is disposed inward of right and left edge portions of a narrower of the pair of cross belts in a widthwise direction of the tire, and comprises;

stress cushioning rubber being disposed between the pair of cross belts and at an outer side of the circumferential reinforcing layer in the widthwise direction of the tire so as to be adjacent to the circumferential reinforcing layer; and edge cushioning rubber disposed between the pair of cross belts and on an outer side of the stress cushioning rubber in the widthwise direction of the tire and at a position corresponding to edge portions of the pair of cross belts so as to be adjacent to the stress cushioning rubber.

15. The pneumatic tire according to claim 14, wherein a modulus Ein at 100% elongation of the stress cushioning rubber and a modulus Eco at 100% elongation of coating rubber of the pair of cross belts have a relationship such that Ein<Eco.

16. The pneumatic tire according to claim 14, wherein a modulus Ein at 100% elongation of the stress cushioning rubber and a modulus Eco at 100% elongation of coating rubber of the pair of cross belts have a relationship such that $0.6 \leq Ein/Eco \leq 0.9$.

17. The pneumatic tire according to claim 14, wherein a modulus Ein at 100% elongation of the stress cushioning rubber is within a range of $4.0\ \text{MPa} \leq Ein \leq 5.5\ \text{MPa}$.

18. The pneumatic tire according to claim 2, wherein the circumferential reinforcing layer is disposed inward of right and left edge portions of a narrower cross belt of the pair of cross belts in a widthwise direction of the tire; and a width Wb3 of the narrower cross belt and a distance S from an edge portion of the circumferential reinforcing layer to an edge portion of the narrower cross belt are within a range 0.03≤S/Wb3.

19. The pneumatic tire according to claim 2 applied to a heavy duty tire with an aspect ratio of no more than 70%.

20. The pneumatic tire according to claim 1, wherein 1.11≤De/Dcc.

21. The pneumatic tire according to claim 2, wherein 1.11≤De/Dcc.

22. The pneumatic tire according to claim 1, wherein 0.74≤Wb2/Wca≤0.83.

23. The pneumatic tire according to claim 2, wherein 0.74≤Wb2/Wca≤0.83.

24. The pneumatic tire according to claim 1, wherein 0.64≤Wg/Wca≤0.80.

25. The pneumatic tire according to claim 2, wherein 0.60≤Wg/SW≤0.78.

26. The pneumatic tire according to claim 1, wherein a width W s of the circumferential reinforcing layer and a tread width TW have a relationship such that 0.82≤Ws/TW≤0.90.

27. The pneumatic tire according to claim 2, wherein a width Ws of the circumferential reinforcing layer and a tread width TW have a relationship such that 0.82≤Ws/TW≤0.90.

28. The pneumatic tire according to claim 1, wherein end portions of the circumferential reinforcing layer are located further outward in a tire width direction than outermost circumferential main grooves of the at least three circumferential main grooves.

29. The pneumatic tire according to claim 2, wherein end portions of the circumferential reinforcing layer are located further outward in a tire width direction than outermost circumferential main grooves of the at least three circumferential main grooves.

30. The pneumatic tire according to claim 1, wherein 1.12≤De/Dcc.

31. The pneumatic tire according to claim 2, wherein 1.12≤De/Dcc.

* * * * *